United States Patent [19]

Hata

[11] Patent Number: 4,899,190
[45] Date of Patent: Feb. 6, 1990

[54] ZOOMING OPTICAL SYSTEM CONTROL DEVICE

[75] Inventor: Daisuke Hata, Funabashi, Japan

[73] Assignee: Ricoh Company, Ltd., Tokyo, Japan

[21] Appl. No.: 200,459

[22] Filed: May 31, 1988

[30] Foreign Application Priority Data

May 31, 1987 [JP] Japan ................................ 62-136634
Jun. 2, 1987 [JP] Japan ................................ 62-137681
Jun. 2, 1987 [JP] Japan ................................ 62-138568

[51] Int. Cl.$^4$ ............................ G03B 3/10; G03B 5/00;
G03B 17/04; G03B 15/22
[52] U.S. Cl. ................................ 354/400; 354/187;
354/195.12; 350/430
[58] Field of Search ............ 354/400, 187, 402, 195.1,
354/195.12; 350/429, 430, 255

[56] References Cited

U.S. PATENT DOCUMENTS 4,721,972 1/1988 Wakabayashi .................. 354/195.1

*Primary Examiner*—W. B. Perkey
*Attorney, Agent, or Firm*—Oblon, Spivak, McClelland, Maier & Neustadt

[57] ABSTRACT

A zooming optical system control device for controlling the setting of a zooming optical system to one of a plurality of regions such as a zooming region wherein the optical system ensures zooming photographing, a macro region wherein the optical system ensures macro photographing and a containment region wherein the optical system is contained into a predetermined position, the optical system having a zooming lens group, a macro lens group and a focusing lens group each disposed on one identical optical axis.

6 Claims, 23 Drawing Sheets

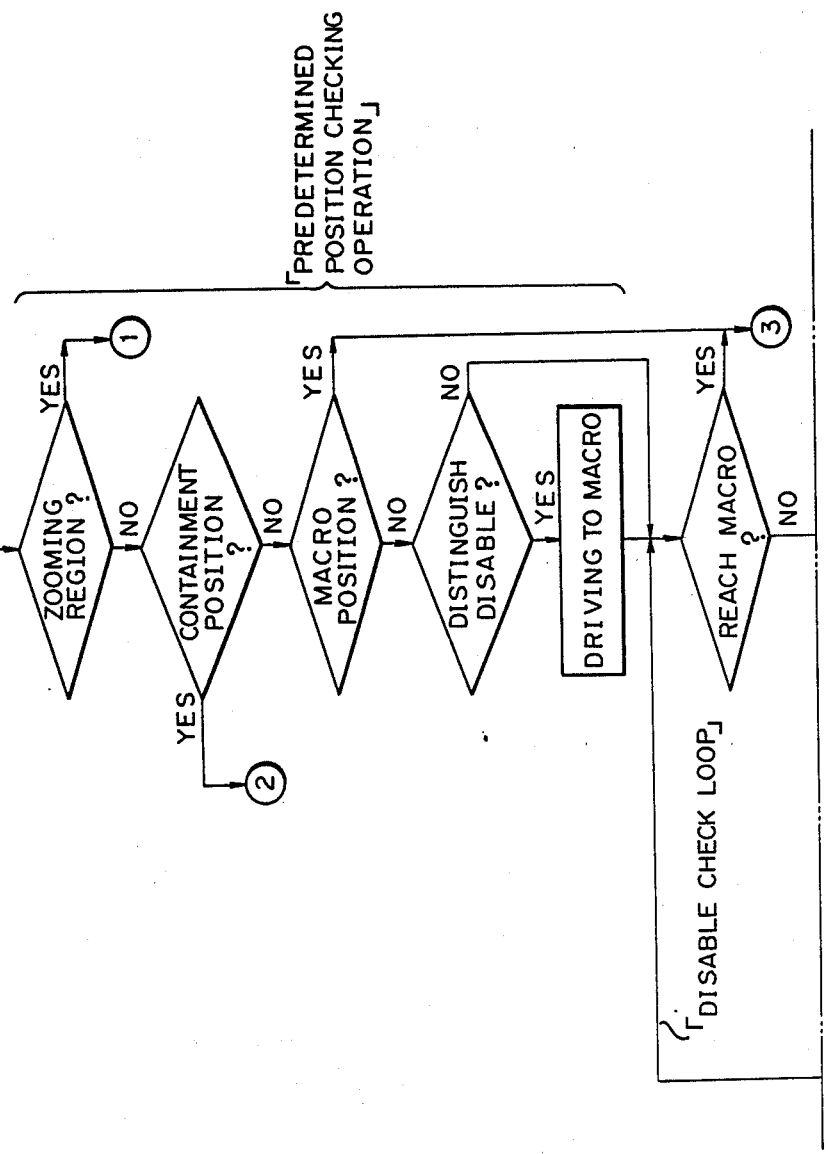

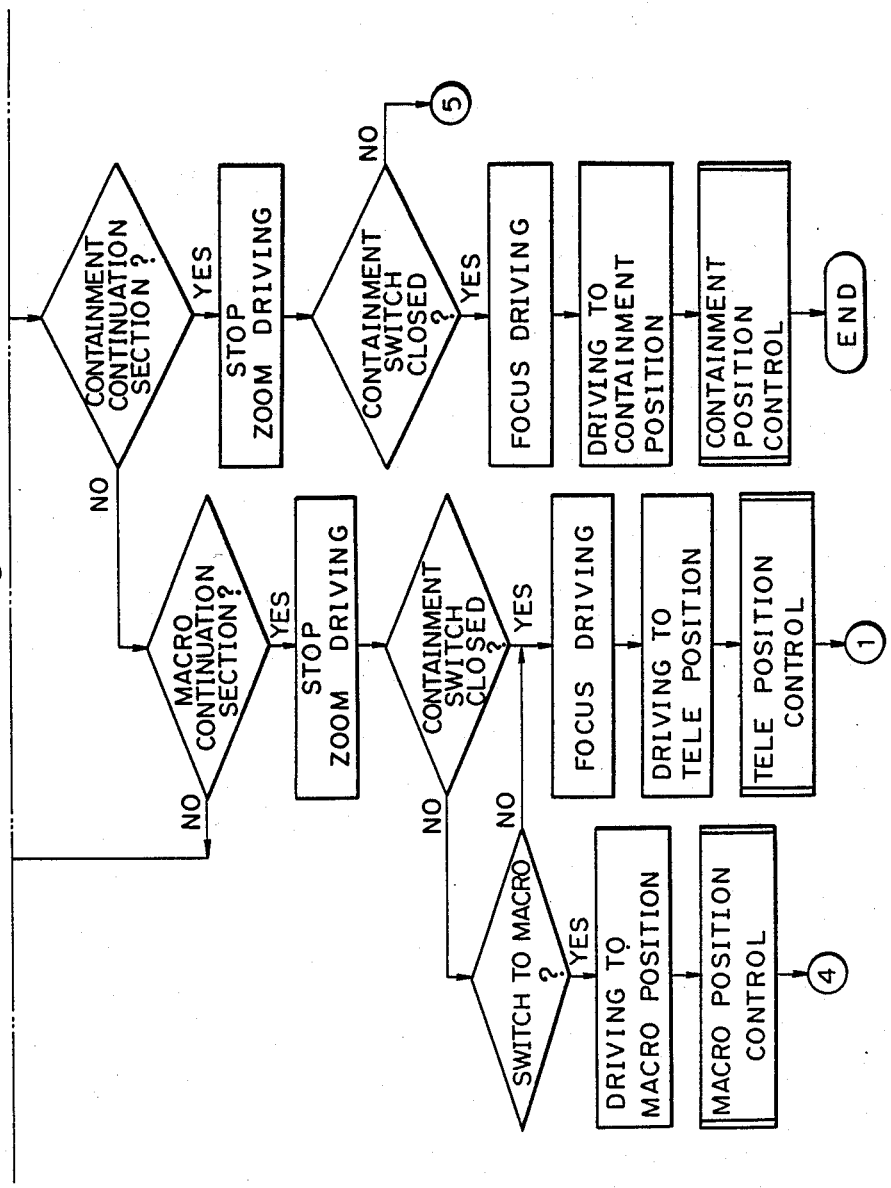

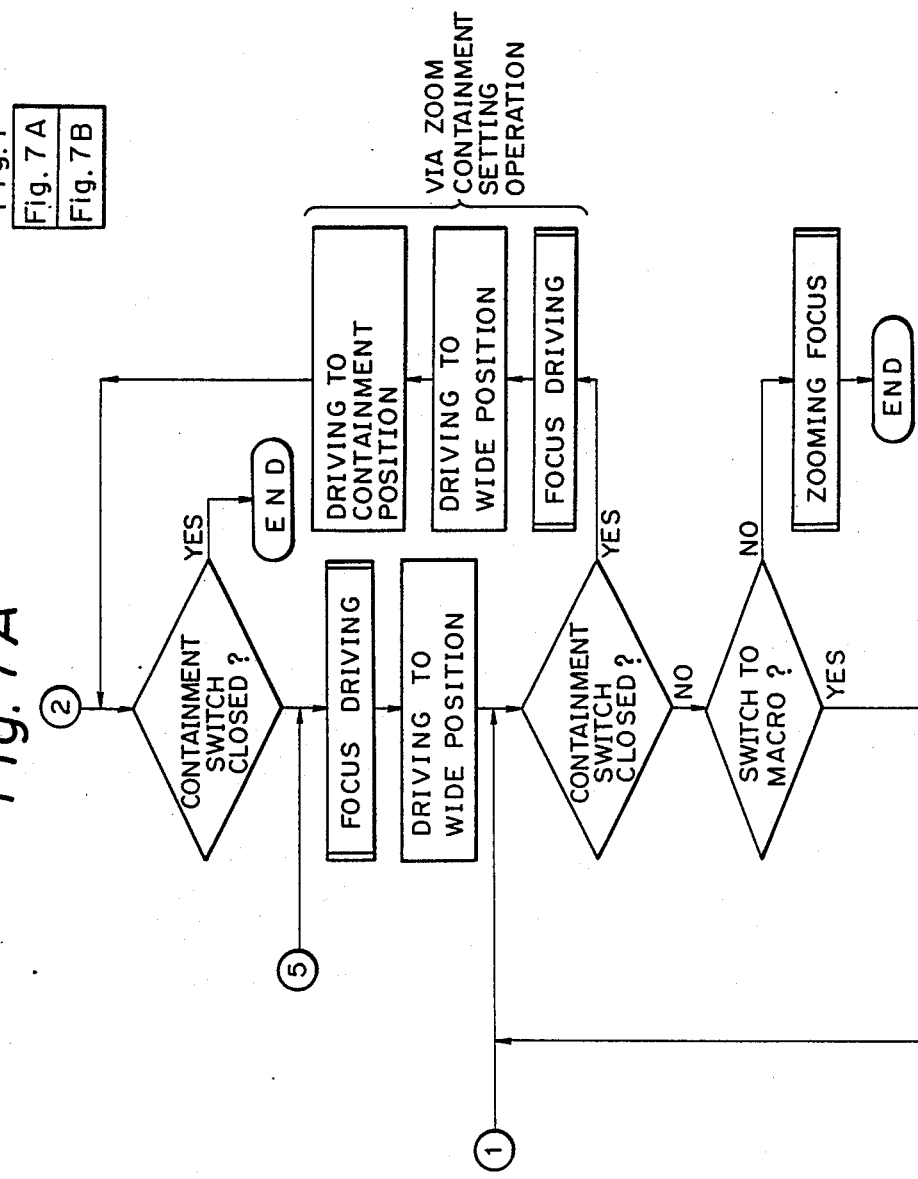

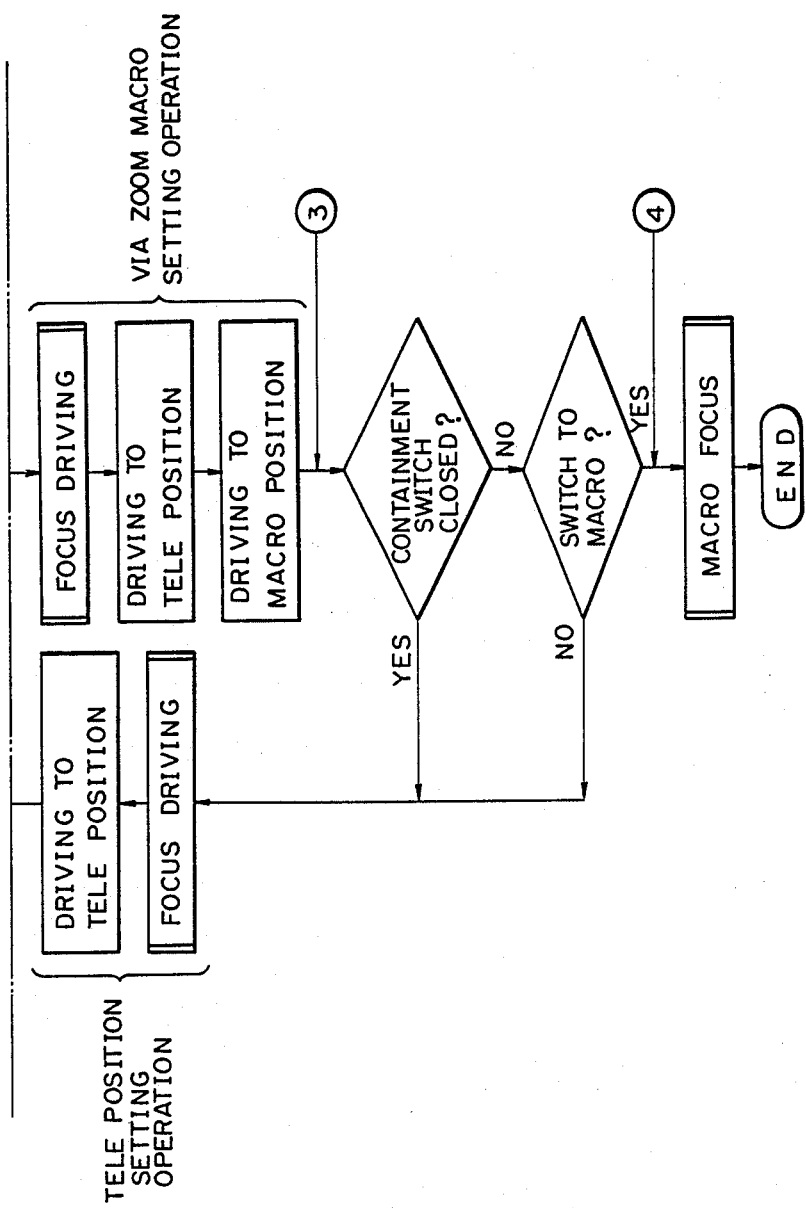

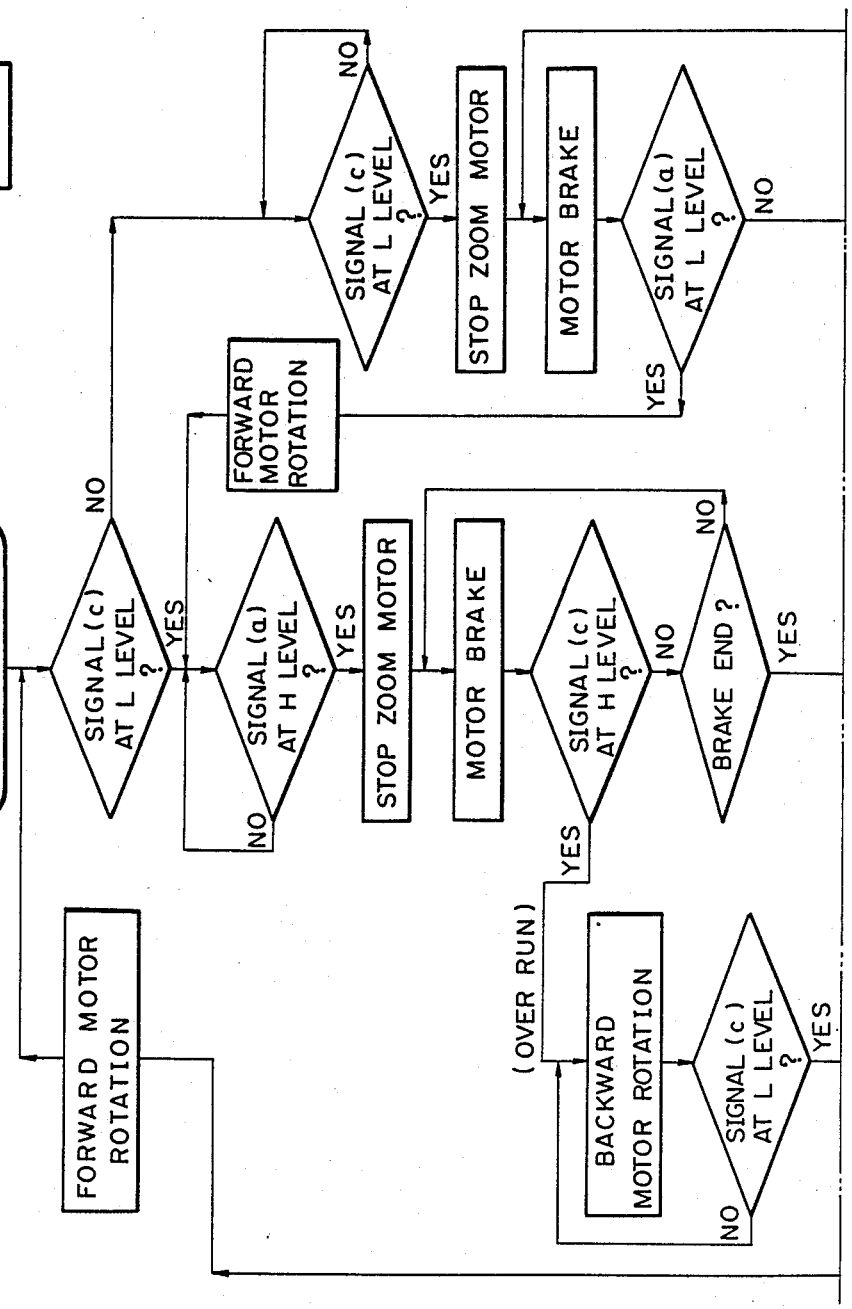

ZOOMING OPTICAL SYSTEM CONTROL DEVICE

BACKGROUND OF THE INVENTION

The present invention concerns a zooming optical control device and, more specifically, it relates to a zooming optical system control device having a zooming optical system which comprises a zooming lens group, a macro lens group and a focusing lens group disposed on one identical optical axis, and which can optionally be set to one of a plurality of regions such as a zooming region capable of varying the focal length by the zooming lens group, a macro region capable of macro photographing by the macro lens group and a containment region for containing each of the lens groups into a predetermined position respectively.

Electronic constitutions or electric driving systems have been introduced remarkably in recent years for camera main bodies and photographing lenses used for the cameras. For instance, in the photographing lenses such that lens groups constituting them are adapted to be driven by a motor, etc. and set into each of a plurality of regions such as a zooming region capable of varying the focal length, a macro region capable of macro photographing and a containment region for rendering the structure compact when they are not used by a one-touch switching operation.

While on the other hand, along with the cost reduction of one chip microcomputers (hereinafter simply referred to as "CPU"), various control operations have now been conducted collectively by the CPU, such as control for the change of the focal length in the zooming region, particularly, control for the compensation of shift in a varifocal lens that generates the deviation for the imaging position (shift) accompanying the change of the focal length in the photographing lenses, as well as control for various automated camera operations, e.g., automatic focusing, automatic exposure, automatic film loading and unloading in camera main bodies.

By the way, although it is possible to control the photographing lenses independently by a CPU incorporated into the lenses per se, it has generally been constituted to control such photographing lenses by the CPU disposed to the camera main body in view of the economical reason. Accordingly, operation switches actuated by a camera user as described above and status detection switches for detecting the state of various mechanical sections of the camera main body and the photographing lenses, etc. are connected to the input ports for recognizing the external state required upon executing various controls by the CPU. However, since the number of the input ports is restricted, while it is different depending on the type of CPU, it is desirable that the number of switches connected to the input ports is as less as possible in order to cope with the extensibility for various control operations, change for the specifications of the camera and the photographing lenses, etc.

By the way, in the photographing lenses having a plurality of regions described above, means are necessary for the CPU to recognize which of the regions the lens group is situated to (for example, switch). Specifically, there may be considered such a means that several stripes of region patterns each having a combination of conductor portions and insulator portions are disposed in a plane, and an electrical brush is moved under sliding contact with the region distinguishing patterns along with the movement of the lens group, so that the region can be distinguished depending on the manner of the combination of the conductor portion and the insulator portion. However, in a case where the pattern is constituted with three stripes which is the least possible number considering the restriction for the number of the input ports as described above and where a resistor body is disposed for detecting the change of the focal length within the zooming region to the region distinguishing pattern, there has been a problem that a non-distinguishing section is formed to a portion of the pattern. Further, in such a constitution not using a mechanical stopper, there has been a problem of over-run in a case of stopping the lens group at one end of a region that the lens group can not be stopped at a correct stop position but intrudes into other adjacent region by residual rotation of a motor even after the disconnection of power supply to the motor for driving the lens group.

By the way, in a case where a containment region and a macro region are disposed in adjacent with both ends of a zooming region, for example, the zooming operation for changing the focal length has generally been actuated by the operation of a zoom switching or changing switch, etc. and as the operation is continued, the lens groups finally arrives at the end of the zooming region. Then, when the switch operation is continued further, the lens group passes over the end and intrudes into other region. In order to prevent this, stoppers are required at both ends of the zooming region for inhibiting this disadvantage. The stopper has been constituted mechanically so far. However, in a case where the containment region and the macro region are disposed in adjacent with the both ends of the zooming region, if the position of the lens group situated in the zooming region is changed to the macro region or the containment region, the stopper has to be released automatically. Accordingly, there have been problems that a release mechanism is required. The control of the mechanism complicates the constitution and generates rattling inherent to the mechanical members and, further, the rattling is increased with the elapse of time to make the operation instable. Furthermore, there is also a problem that the scale is inevitably increased since it is mechanical constitution, which provides an economical disadvantage in combination with the complicated structure as described above.

In addition, although it is possible to release the stopper by the manual operation, this causes another problem of reducing the operationability.

While on the other hand, the conventional photographing lenses comprise each of the lens groups, that is, the zooming lens group, the macro lens group and the focusing lens group and adapted to change the setting region by the movement of the zooming lens group, further change the focal length in the zooming region and enable the focusing operation by moving a portion of the zooming lens group independently from the zooming operation for changing the focal length. In a so-called vari-focal lens, the focusing position to an identical object in the zooming region varies depending on the focal length and, generally, it draws a hyperbolic curve. More specifically, taking the infinite position ($\infty$) on an optical axis corresponding to the infinite object distance as a standard (invariable), the focusing position at the nearest position and on the side of the nearest position on the optical axis corresponding to the nearest object distance forms a focusing curve represented by such a hyperbola that the delivery amount from the $\infty$ position is increased as the focal length approaches the lowest focal point (TELE) side and the delivery amount is decreased as it approaches the shortest focal point (WIDE) side. Accordingly, the movable region of the focusing lens group is between the ∞ position and the nearest position as described above. Then, a stopper of a shape along with the focusing curve in the equivalent manner is formed for inhibiting the movement of the focusing lens group at the terminal end on the nearest position side of the movable region, whereas a stopper of a shape invariable to the change of the focal length, that is, of a linear shape is formed at the ∞ position. Accordingly, in a case where the focusing lens is near the nearest position on the TELE side described above, since the focusing lens group is also driven as a portion of the zooming lens by the zooming operation and the region changing operation for changing the setting region, if the setting region is being to be changed from the zooming region to the containment region assuming that the containment region is in adjacent with the WIDE side, a portion of the zooming lens group comes to hit and abut against the hyperbola stopper to result in a problem that the region changing operation is inhibited at the midway of the zooming region.

SUMMARY OF THE INVENTION

A first object of the present invention is to provide a zooming optical system control device capable of setting a zooming optical system to a designated region rapidly and reliably in an inexpensive and simple structure.

The second object of the present invention is to provide a zooming optical system control device of a high operationability capable of reliably stopping the zooming optical system at the boundary between each of the regions.

The third object of the present invention is to provide a zooming optical system control device of a high operationability capable of automatically and reliably avoiding that the movement of the zooming optical system is inhibited by the focusing lens group stopping means upon executing the region changing operation.

According to the present invention, the first object can be achieved by a first zooming optical system control device for controlling the setting of a zooming optical system to one of a plurality of regions such as a zooming region wherein said optical system ensures zooming photographing, a macro region wherein said optical system ensures macro photographing and a containment region wherein said optical system is contained into a predetermined position, said optical system comprising a zooming lens group, a macro lens group and a focusing lens group each disposed on one identical optical axis, said control device comprising;

(a) a generating means for generating a distinguishing information representing said one of a plurality of regions wherein said optical system is situated and for generating a disable information representing that said optical system is situated in a non-distinguishable region in which said generating means can not distinguish a region wherein said optical system is situated in a case where said optical system is situated in said non-distinguishable region, (b) an instructing means for instructing a setting region whereto said optical system is to be set, (c) a driving means for driving said optical system in order to set said optical system to said setting region, and (d) a control means for controlling said driving means in such a manner that said driving means drives said optical system to said setting region and drives said optical system toward said one of a plurality of regions when said generating means generates said disable information, and a second zooming optical system control device for controlling the setting of a zooming optical system to one of a plurality of regions such as a zooming region wherein said optical system ensures zooming photographing, a macro region wherein said optical system ensures macro photographing and a containment region wherein said optical system is contained into a predetermined position, said optical system comprising a zooming lens group, a macro lens group and a focusing lens group each disposed on one identical optical axis, said control device comprising;

(a) a generating means for generating a distinguishing information representing said one of a plurality of regions wherein said optical system is situated, said generating means having a boundary region corresponding to a boundary between two of said plurality of regions adjacent to each other, (b) an instructing means for instructing a setting region whereto said optical system is to be set, (c) a driving means for driving said optical system in order to set said optical system to said setting region and having a balance region in which the positions of said lens groups along said optical axis does not change in a case where said driving means operates, said balance region corresponding to said boundary region, and (d) a control means for controlling said driving means in such a manner that said driving means stops driving said optical system when said optical system reaches to one end of said boundary region from outside of said boundary region in a case where said optical system is driven to said boundary region instructed by said instructing means, and that said driving means starts driving said optical system in a direction from the other end of said boundary region to said one end of said boundary region only in a case where said optical system passes through said other end of said boundary region by an overrun when a predetermined time has passed after said optical system passes through said one end of said boundary region, whereby said optical system stops inside of said boundary region.

According to the first device, since it is adapted such that the optical system that is to be set to a plurality of regions, when it is situated in a non-distinguishable region, is forcively driven to one of a plurality of the regions where the generating means can distinguish the present position of the optical system and, thereafter, driven to the instructed region, the optical system can rapidly and reliably be set to the indicated region with an inexpensive and simple structure even by the use of such the generation means as simplified by so much that the distinguishment is disabled at a portion.

In addition, according to the second device, since it is so adapted that the boundary region of a predetermined length disposed at the boundary between adjacent regions is corresponded to the balance region in which the position of the lens group on the optical axis is not changed, the optical system is stopped in the boundary region, driving in the identical direction with the driving direction just before stopping is inhibited and the lens group is driven in the opposite direction passing within over the boundary region to finally stop it in the boundary region, it is possible to provide a zooming optical system control device capable of reliably stopping within the boundary region with a simple structure and without using mechanical stopping means and causing no deviation in the stopping position of the zooming optical system upon stopping at any of the positions in the boundary region.

According to the present invention, the second object can be achieved by a third zooming optical system control device for controlling the setting of a zooming optical system to one of a plurality of regions such as a zooming region wherein said optical system ensures zooming photographing, a macro region wherein said optical system ensures macro photographing and a containment region wherein said optical system is contained into a predetermined position, said optical system comprising a zooming lens group, a macro lens group and a focusing lens group each disposed on one identical optical axis, said control device comprising;

(a) a generating means for generating a distinguishing information representing said one of a plurality of regions wherein said optical system is situated, (b) an instructing means for instructing a setting region whereto said optical system is to be set, (c) a driving means for driving said optical system in order to set said optical system to said setting region, (d) a boundary detection means for receiving said distinguishing information and outputting a boundary signal when said optical system is situated at a boundary between two of said plurality of regions adjacent with each other, and (e) a control means for controlling said driving means in such a manner that said driving means drives said optical system to said setting region when said control means receives an instruction from said instruction means, and that said driving means stops said optical system only when said control means receives both of said boundary signal and said instruction, whereby said optical system stops at said boundary based on said distinguishing information, and a fourth zooming optical system control device for controlling the setting of a zooming optical system to one of a plurality of regions such as a zooming region wherein said optical system ensures zooming photographing, a macro region wherein said optical system ensures macro photographing and a containment region wherein said optical system is contained into a predetermined position, said optical system comprising a zooming lens group, a macro lens group and a focusing lens group each disposed on one identical optical axis, said control device comprising;

(a) a generating means for generating a distinguishing information representing said one of a plurality of regions wherein said optical system is situated, (b) an instructing means for instructing a setting region whereto said optical system is to be set, (c) a driving means for driving said optical system in order to set said optical system to said setting region, (d) a boundary detection means for receiving said distinguishing information and outputting a boundary signal when said optical system is situated at a boundary between two of said plurality of regions adjacent with each other, and (e) a control means for controlling said driving means in such a manner that said driving means drives said optical system to said setting region when said control means receives an instruction from said instruction means, and that said driving means stops said optical system only when said control means receives both said boundary signal and said instruction in a case where said instruction represents that said driving means drives said optical system so as not to cross said boundary, and that said driving means does not stop said optical system at said boundary in a case where said instruction represents that said driving means drives said optical system so as to cross said boundary.

According to the third device, since it is adapted such that the optical system that can be optionally set to a plurality of regions such as a zooming region, a macro region and a containment region is driven by the control means, arrival of the zooming optical system at the boundary to the adjacent region is judged based on the output from the generation means, and driving for the optical system is stopped by the controlling means the optical system can surely be stopped at the boundary with an inexpensive and simple structure and without using a stopping means comprising mechanical stopper.

According to the fourth device, since the stopping operation of the control means is inhibited upon setting the optical system to the optional region, although the optical system can reliably be stopped at the boundary in the operation according to the third invention, the stopping operation is not performed even when the optical system reaches the boundary in the operation according to the forth invention and the system can smoothly pass through the boundary with no troubles and be set to the desired region and, accordingly, a zooming optical system control device of rapidly operating and with high operationability can be provided.

According to the present invention, the third object can be achieved by a fifth zooming optical system control device for controlling the setting of a zooming optical system to one of a plurality of regions such as a zooming region wherein said optical system ensures zooming photographing, a macro region wherein said optical system ensures macro photographing and a containment region wherein said optical system is contained into a predetermined position, said optical system comprising a zooming lens group, a macro lens group and a focusing lens group each disposed on one identical optical axis, said control device comprising;

(a) an instructing means for instructing a setting region whereto said optical system is to be set, (b) a zoom driving means for driving said optical system in order to set said optical system to said setting region, (c) a focus driving means for driving said focussing lens group so as to adjust a focal length of said focussing lens group in order to complete an image, (d) a stopping means disposed at both ends of a movable zone in which said focussing lens group can move for stopping a movement of said focussing lens group, said stopping means having at least one of said both ends an invariable stopping portion for making a stopping position of said optical system invariable irrespective of a change of said focal length and for allowing that said zooming lens group and said macro lens group move, and (e) a control means for controlling both of said zoom driving means and said focus driving means in such a manner that said focus driving means drives said focusing lens group to a vicinity of said invariable stopping portion before said zoom driving means drives said optical system to said setting region, and a sixth zooming optical system control device for controlling the setting of a zooming optical system to one of a plurality of regions such as a zooming region wherein said optical system ensures zooming photographing, a macro region wherein said optical system ensures macro photographing and a containment region wherein said optical system is contained into a predetermined position, said optical system comprising a zooming lens group, a macro lens group and a focusing lens group each disposed on one identical optical axis, said control device comprising;

(a) an instructing means for instructing a setting region whereto said optical system is to be set, (b) a zoom driving means for driving said optical system in order to set said optical system to said setting region, (c) a focus driving means for driving said focusing lens group in order to adjust a focal length to complete image, (d) a stopping means for stopping a movement of said focusing lens group and for inhibiting movements of said zooming lens group and said macro lens group, said stopping means having an inhibition area wherein a stopping position of said focusing lens group and inhibited positions of said zooming lens group and said macro lens group varys according to a change of said focal length, said stopping means having a non-inhibition area wherein said movement of said focusing lens group and said movements of said zooming lens group and said macro lens group is allowed, said inhibition area disposed to one of said both ends of a movable zone wherein said focusing lens group can move, said noninhibition area disposed within said movable zone in adjacent to said inhibition area, (e) a region judging means for judging whether said optical system is situated in said inhibition area or said noninhibition area, (f) a control means for controlling both of said zoom driving means and said focus driving means in such a manner that said focus driving means drives said focus lens group to said noninhibition area when said optical system is within said inhibition area by way of said region judging means before said zoom driving means drives said optical system to said setting region.

According to the fifth device, although restriction is applied by a stopping means having an invariable stopping portion at one terminal end of a movable region for the focusing lens group that does not vary the position for stopping the focusing lens group by the change of the focal length and does not inhibit the region changing operation for changing the setting of the optical system to any one of a plurality of setting regions, an inhibition area at the inside of the other terminal end that stops the movement of the focusing lens group, inhibits the region changing operation of the optical system and varies the stopping and inhibiting position along with the change of the focal length and a noninhibition area in contiguous from the inhibition area to one of the terminal and that can not stop the focusing lens and can not inhibit the optical system as well, it is adapted such that the focusing lens group is driven to a vicinity of the invariable stopping portion prior to the execution of the region changing operation as the fifth device.

Further, according to the sixth device, since the focusing lens group is driven to the inside of the noninhibition area prior to the execution of the region changing operation, it is possible to provide a zooming optical system control device capable of automatically avoiding the locking of the region changing operation due to the stopping means liable to occur in the optical system having a plurality of setting regions with an inexpensive and simple structure and, particularly, capable of shortening the operation time required for the avoidance thereby improving the operationability in the sixth device.

BRIEF DESCRIPTION OF THE DRAWINGS

FIGS. 6, 7, 8 and 9 are diagrams illustrating how FIGS. 6A and 6B; FIGS. 7A and 7B; FIGS. 8A and 8B; and FIGS. 9A and 9B; respectively are arranged;

FIGS. 6A, 6B, 7A, 7B, 8A, 8B, 9A, 9B and 10 to 14 are flow charts illustrating the operation sequence of the embodiment shown in FIG. 1, in which FIGS. 6A, 6B, 7A and 7B are the main routine showing the entire operation sequence;

FIGS. 8A, 8B, 9A, 9B and 10 to 14 are sub-routines used in these main routines, in, which the respective contents are:

FIGS. 8A and 8B for the WIDE, position control,

FIGS. 9A and 9B for the TELE position control,

FIG. 10 for the macro position control,

FIG. 11 for the containment position control,

FIG. 12 for the containment position retraction,

FIG. 13 for the macro position retraction and

FIG. 14 for the stop control (ZBM) due to interruption;

FIG. 16 and FIG. 17 are flow charts illustrating the operation sequence of the embodiment shown in FIG. 15, in which FIG. 16 shows the sequence of the changing operation for changing the set region and FIG. 17 mainly shows the zooming operation of the sub-routine "zooming focus" shown in FIG. 16 and;

FIG. 4 shows the stop control (ZBM) due to interruption generated in the zooming operation;

FIG. 20 through FIG. 22 are flow charts showing the operation sequence of FIG. 7 and FIG. 18, in which FIG. 20 and FIG. 7 show main routine and FIG. 21 and FIG. 22 show the sub-routines "focus driving" used in the main routine, FIG. 21 illustrating the operation of a main portion according to the fifth invention;

FIG. 22 illustrating the operation of a main portion according to the sixth invention.

DETAILED DESCRIPTION OF THE PREFERRED EMBODIMENTS

The present invention will be described specifically by way of preferred embodiments referring to accompanying drawings.

Figure 1:
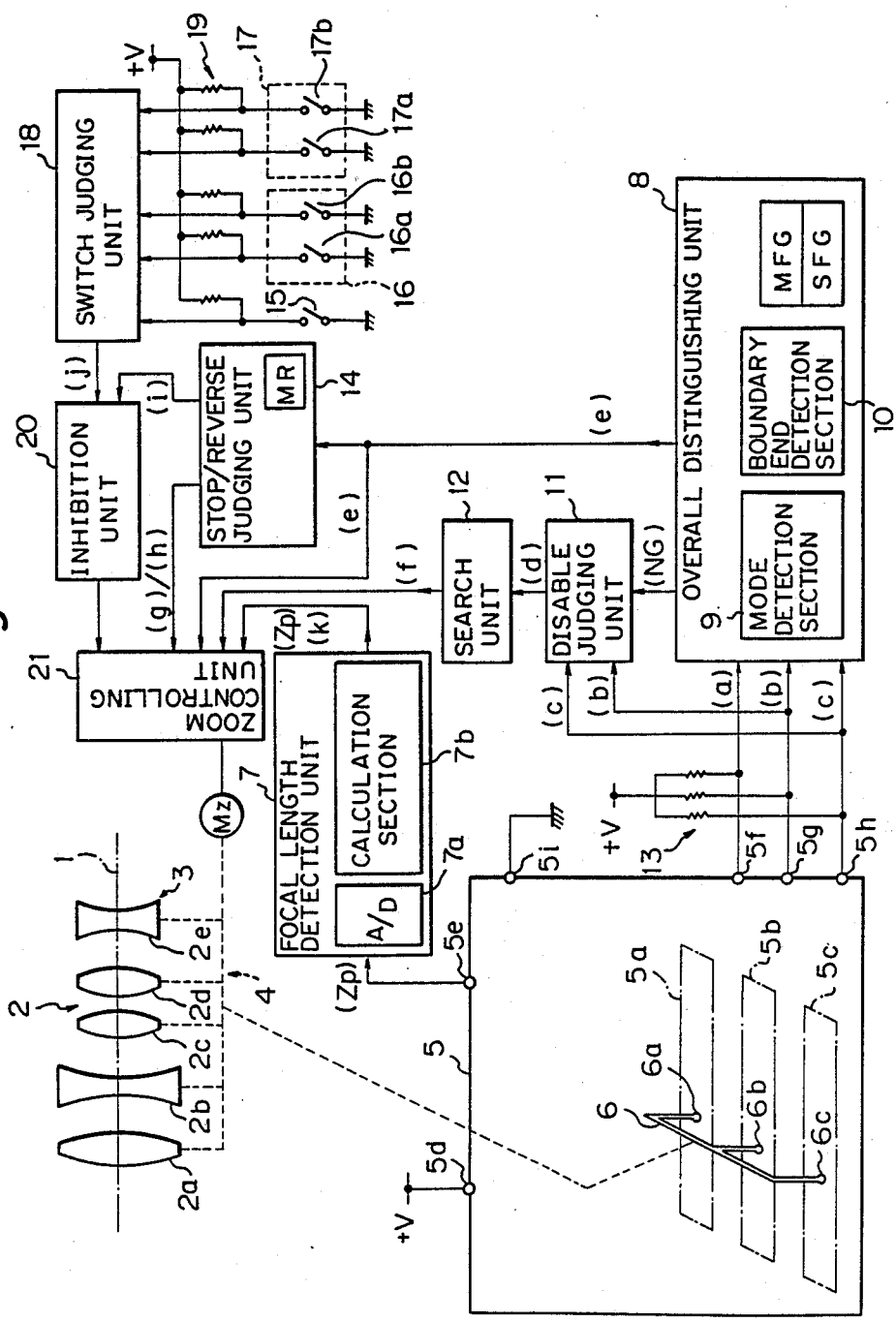
FIG. 1 is a block diagram illustrating the entire constitution of a zooming optical system control device as a first embodiment according to the present invention.

FIG. 1 is a block diagram illustrating the entire constitution of the first and the second zooming optical system control device.

In FIG. 1, there are shown an optical axis 1 for the zooming optical system, a zooming optical system 2 disposed on the optical axis 1 movably therealong and first lens group 2a, second lens group 2b, third lens group 2c, fourth lens group 2d and fifth lens group 2e each composed of a single lens or a plurality of lenses. The focusing lens group 3 is constituted with the lens group 2e, and the zooming lens group and the macro lens group are constituted with the lens group 2a - the lens group 2e. The focal length of the zooming lens group is f. A zoom driving unit 4 comprises a zooming motor Mz and a mechanical section not illustrated for driving the optical system 2 so as to set the optical system 2 to any one of the containment region wherein the optical system 2 is contained into a predetermined position, the zooming region wherein the optical system 2 ensures macro photographing and the macro region wherein the optical system 2 ensures macro photographing respectively. Particularly, in the zooming region, the optical system 2 acts as the zooming lens group so as to set the focal length f to an optional focal length between the telescopic side focal length which is the longest focal length (hereinafter simply referred to as "TELE" position) to the wide angle side focal length which is the shortest focal length (hereinafter simply referred to "WIDE" position). In the macro region, the optical system 2 acts as the macro lens group.

The lens group 3 is so adapted that it can be driven to a position between the infinite position ($\infty$) and the nearest position on the optical axis 1 corresponding to the object distance between the infinite distance and the nearest distance by a focus driving unit comprising a focus motor and a mechanical unit although not illustrated, independent of the driving by the driving unit 4. A distinguishing pattern unit 5 to be described specifically later comprises a first pattern 5a, a second pattern 5b, a third pattern 5c, a power source terminal 5d connected to a power source +V, an output terminal 5e for outputting a focal distance information (Zp) in proportion with the focal length f, and the output terminals 5f, 5g and 5h for outputting distinguishing information adapted to output zooming region signal (a), macro region signal (b) and containment region signal (c) respectively. A terminal 5i is grounded to the earth. A brush 6 is adapted to be driven together with the optical system 2 by the driving unit 4 and comprises contacts 6a, 6b and 6c being adapted to be slidable with patterns 5a, 5b and 5c respectively, in which the contacts 6a, 6b and 6c are made of conductors integrally formed with the main body of the brush 6. A focal length detection unit 7 is adapted to receive the information (Zp), apply an A/D conversion in an A/D converter 7a, conduct a predetermined calculation, for example, shift compensation in a calculation section 7b and output the result as a calculation output (k). An overall distinguishing unit 8 is adapted to receive each of the signals (a), (b) and (c) and output a region signal (e) indicating the region whereat the optical system 2 is situated, as well as output a negative signal (NG) if the optical system 2 is not situated in one of the predetermined positions and the unit 8 comprises a mode detection unit 9, a boundary end detection section 10, a macro position flag MFG and a containment position flag SFG. A disable judging unit 11 is adapted to receive the signal (b), signal (c) and signal (NG) and output a disable signal (d) if the distinguishing is disable. A search unit 12 is adapted to receive the signal (d) and output a search signal (f). Pull-up resistors 13 are connected at respective one ends in parallel with the power source +V and at the other end to output terminals 5f, 5g and 5h of the pattern unit 5 respectively. A stop/reverse judging unit 14 is adapted to receive the signal (e), store the latest driving direction to an internal memory MR, conduct predetermined judgment detailed later and, based on the result, output a stop signal (h), a reverse signal (g) and an inhibition signal (i). Momentary switches 15, 16 and 17 all of which are closed only when pushed by external operation enable in which the switches 15 and 16 are containment switch and zooming/macro changing switch for changing the zooming region and the macro region (hereinafter simply referred to as "Z/M changing switch") respectively and the switch 17 is a zoming ratio changing switch for setting the focal length f in the zooming region. The Z/M changing switch 16 comprises a zooming switch 16a and a macro switch 16b, while the switch 17 comprises a zooming ratio up switch (hereinafter simply referred to as "up-switch") 17a and a zooming ratio down switch (hereinafter simply referred to as "downswitch") 17b. The switch 17 is so adapted that the operation thereof is effective only when the optical system 2 is within the zooming region. There are also provided a switch judging unit 18 which is connected with respective one ends of the switches 15, 16 and 17, judges the state of the each of the switches 15, 16 and 17 and outputs such state as the state signal (j), and pull-up resistors 19 connected at respective one ends to the power source +V in parallel and at the other ends to the switch 15, switch 16a, switch 16 b, up-switch 17a and down-switch 17b respectively. All of the other ends of the switches 15, 16a, 16b, 17a and 17b are grounded to the earth. An inhibition unit 20 is adapted to receive the signal (j), not output this signal (j) corresponding to the identical direction with the latest driving direction while the signal (i) is being received, and output the inputted signal (j) as it is when the signal (i) is not being received. A zoom controlling unit 21 is adapted to control the driving unit 4 while receiving the output from the inhibiting unit 20, the calculation output (k) from the detection unit 7, the information (Zp), the signal (e), the signal (f), and the signal (g) or the signal (h) respectively. Input and output for each of the units are shown only for the main signals.

Figure 2:
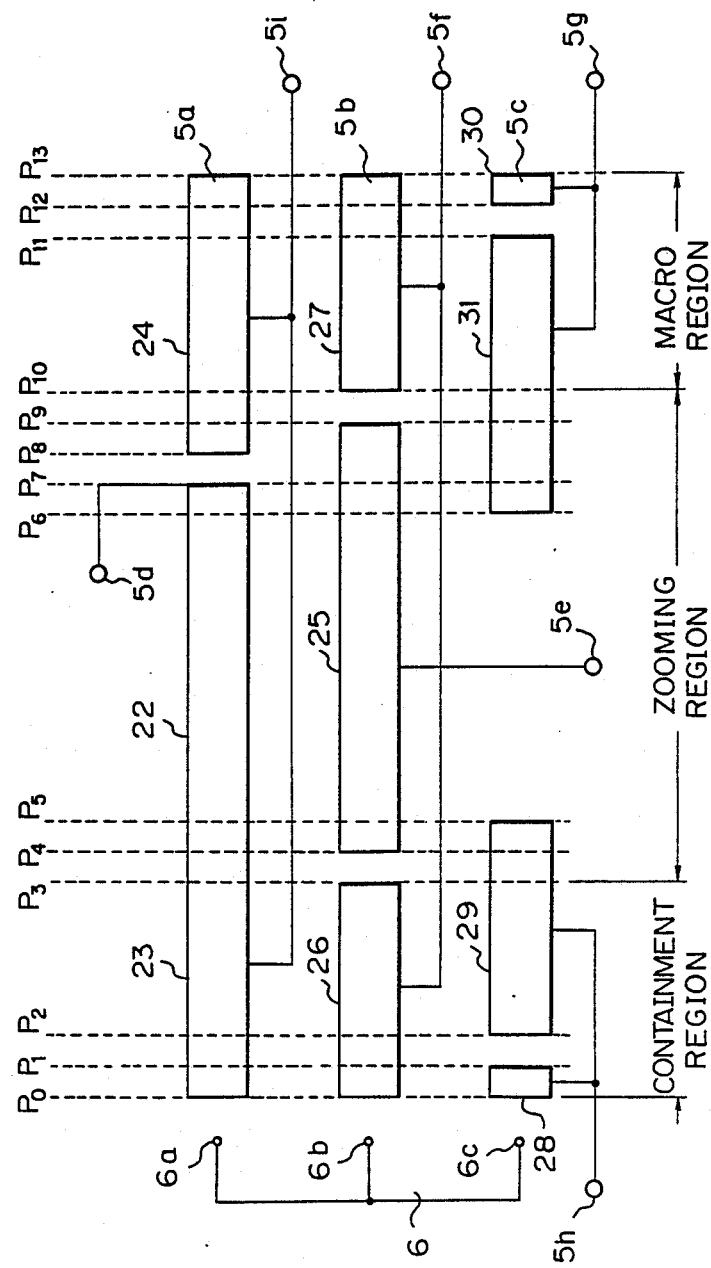
FIG. 2 shows a detailed pattern diagram enlarging a portion of a distinguishing pattern portion shown in FIG. 1, FIG. 15 and FIG. 18.

FIG. 2 is a pattern diagram showing the pattern unit 5 specifically. Identical portions as those in FIG. 1 carry the same reference numerals, for which explanations are omitted.

In FIG. 2, portions 22 to 24 constitute a portion of the pattern 5a, which comprises a pattern 22 made of a resistor member for generating focal length information (hereinafter simply referred to as "Zp pattern") and ground pattern 23 and 24 made of conductor and connected to a grounding terminal 5a. Portions 26 to 27 constitute a portion of the pattern 5b, which comprise a conductor 25 connected to an output terminal 5e acting as a collector pattern for detecting the voltage generated in the Zp pattern 22 (information Zp) by way of the contacts 6a, 6b of the brush 6, non-zooming patterns 26 and 27 made of conductor connected to an output terminal 5f. Portions 28 to 31 constitute a portion of the pattern 5c, in which both of 28 and 29 are the containment position pattern and a containment brake pattern made of conductors and connected with an output terminal 5h and both of 30 and 31 are a macro position pattern and a macro brake pattern made of conductors connected to an output terminal 5g. There are shown $P_0$ to $P_{13}$ respectively for the following positions, that is, $P_0$ for the position at respective one end of the ground pattern 23, the pattern 26 and the pattern 28, $P_1$ for the position at the other end of the pattern 28, $P_2$ for the position at one end of the pattern 29, $P_3$ for the position at the other end of the pattern 26, $P_4$ for the position at one end of the pattern 25, $P_5$ for the position where the other end of the pattern 23 and one end of the Zp pattern 22 are in contact with each other and for the position at the other end of the pattern 29, $P_6$ for the position at one end of the pattern 31, $P_7$ for the position at the other end of the Zp pattern 22 to which electric power is applied by the power source, $P_8$ for the position at one end of the pattern 24, $P_9$ for the position at the other end of the pattern 25, $P_{10}$ for the position at one end of the pattern 27, $P_{11}$ for the position at the other end of the pattern 31, $P_{12}$ for the position at one end of the pattern 30, $P_{13}$ for the position at the respective other ends of the pattern 24, the pattern 27 and the pattern 30. Insulation portions are formed with $P_7$-$P_8$ for the pattern 5a, $P_3$-$P_4$ and $P_9$-$P_{10}$ for the pattern 5b, and $P_1$-$P_2$, $P_5$-$P_6$ and $P_{11}$-$P_{12}$ for the pattern 5c respectively. Except for the insulation portion formed with $P_5$-$P_6$, each of the gaps is formed so narrow as not to be shortcircuitted by each of the contacts 6a, 6b and 6c. The movable range of the brush 6 is $P_0$-$P_{13}$. Hereinafter they are referred ti as below $P_0$-$P_3$ as containment region, $P_3$-$P_{10}$ as zooming region, $P_{10}$-$P_{13}$ as macro region, $P_0$ to $P_1$ as containment position, $P_1$-$P_2$ as containment approaching position, $P_2$-$P_3$ as containment continuation section, $P_3$-$P_5$ and $P_8$-$P_{10}$ as WIDE Position and TELE position respectively, $P_5$-$P_8$ as focal length variable section, $P_{10}$-$P_{11}$ as macro continuation section, $P_{11}$-$P_{12}$ as macro approaching position, $P_{12}$-$P_{13}$ as macro position. As can be seen from FIG. 2, $P_6$-$P_7$ for the Zp pattern 22 and the insulation portion $P_7$-$P_8$ succeeding thereto overlap with $P_6$-$P_8$ of the pattern 31. In order to prevent to the potential on the pattern 25 from becoming instable when the contact 6a of the brush 6 is on $P_7$-$P_8$ of the pattern 5a, the voltage supplied by way of the resistors 13 to the pattern 31 is supplied by way of the contacts 6c and 6b to the pattern 25, so that the information Zp outputted from the terminal 5e in the focal point variable region is prevented from becoming instable. Further, the flag SFG and the flag MPG shown in FIG. 1 are set when the optical system 2 is at the containment position and the macro position respectively and reset at other positions.

Figure 3:
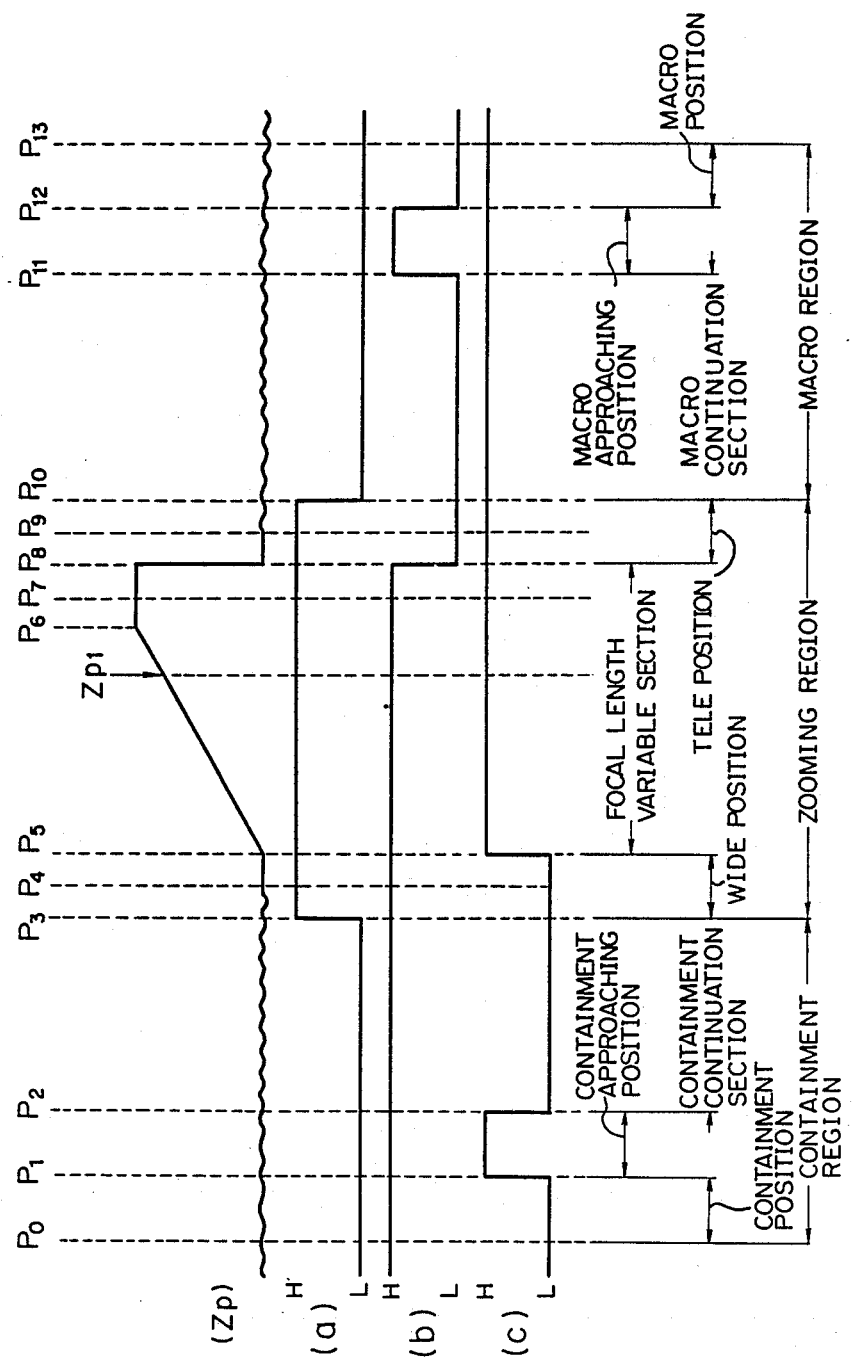
FIG. 3 is a timing charge illustrating the operation waveform outputted from the distinguishing pattern portion.

FIG. 3 is a timing chart showing the changes of the voltage waveforms in each units along with the movement of the brush 6. Identical portions with those shown in FIG. 1 and FIG. 2 carry the same reference numerals, for which explanations are omitted.

In FIG. 3, the information Zp is an analog signal and all of other signals (a), (b) and (c) are level signals of H and L levels. In the waveform illustrating the information Zp, corrugating portions $P_0$-$P_4$ and $P_9$-$P_{13}$ illustrate the portions where the potential is indefinite.

Referring to the principle for generating each of the waveforms in accordance with the position for the brush 6, if the brush 6 is situated between $P_0$-$P_1$ in FIG. 2 for instance, since the pattern 23, the pattern 26 and the pattern 28 are short-circuited by the contacts 6a, 6b and 6c by means of the brush 6 respectively and the pattern 23 is grounded to the earth, the signal (a) of the terminal 5f is at the L level, while signal (c) of the terminal 5h is also at the L level, the signal (b) of the terminal 5g is at the H level because the terminal 5g is pulled-up by the pull-up resistors 13 and, since the position of the brush 6 is between $P_0$-$P_1$, the pattern 31 and the pattern 30 are opened. Since the pattern 25 and the pattern 23 are short-circuited by the brush 6 when the brush is situated between $P_4$-$P_5$, the potential at the output terminal 5e (information (Zp)) is at 0 potential. Then, as the brush moves from $P_5$ to $P_6$, the potential increases and reaches substantially $+V$ of the power source potential between $P_6$-$P_8$.

Figure 4:
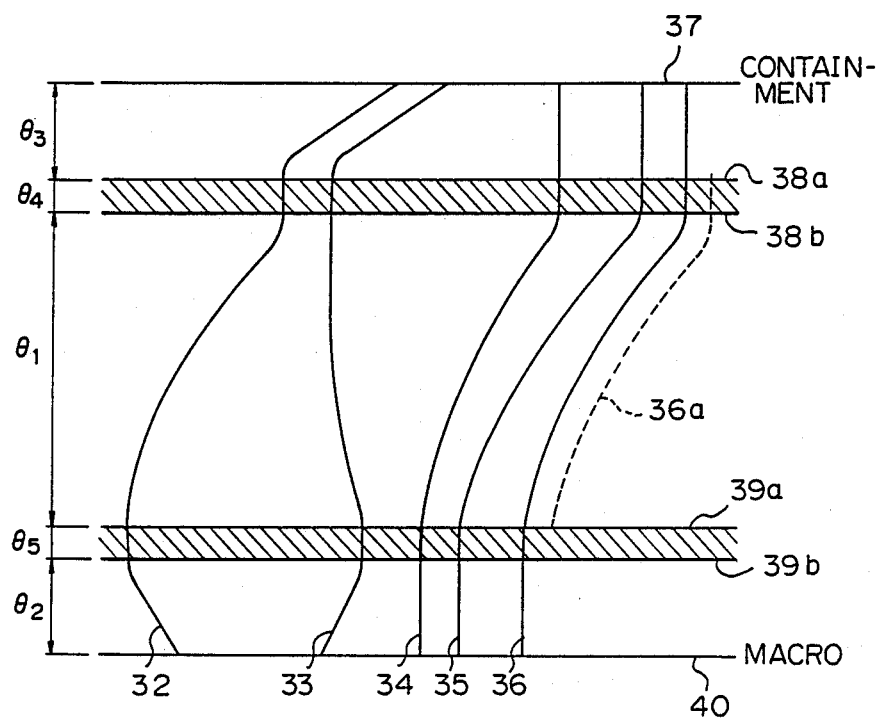
FIG. 4 is a cam diagram illustrating the mechanical characteristic of the zooming optical system shown in FIG. 1, FIG. 15 and FIG. 18.

FIG. 4 is a cam diagram showing the characteristics of the optical system 2 in FIG. 1. In FIG. 4, cam lines 32-36 show the movement of the lens group 2a-lens group 2e respectively in which the cam line 36 is specifically for the ∞ position, cam line 36a is for the nearest position. There are also shown a containment position 37 corresponding to $P_0$-$P_1$ in FIG. 2, positions 38a and 38b corresponding to $P_3$ and $P_5$ respectively in FIG. 2, positions 39a and 39b corresponding to $P_8$ and $P_{10}$ respectively in FIG. 2, a macro position 40 corresponding to $P_{12}$-$P_{13}$ in FIG. 2, $\downarrow_1$ for the focal point variable section corresponding to $P_5$-$P_8$, $\theta_2$ for the macro region corresponding to $P_{10}$-$P_{13}$, $\theta_3$ for the containment region corresponding to $P_0$-$P_3$, $\theta_4$ and $\theta_5$ for balance regions on the WIDE side and the TELE side corresponding to the WIDE positions $P_3$-$P_5$ and the TELE position $P_8$-$P_{10}$ respectively.

Figure 5:
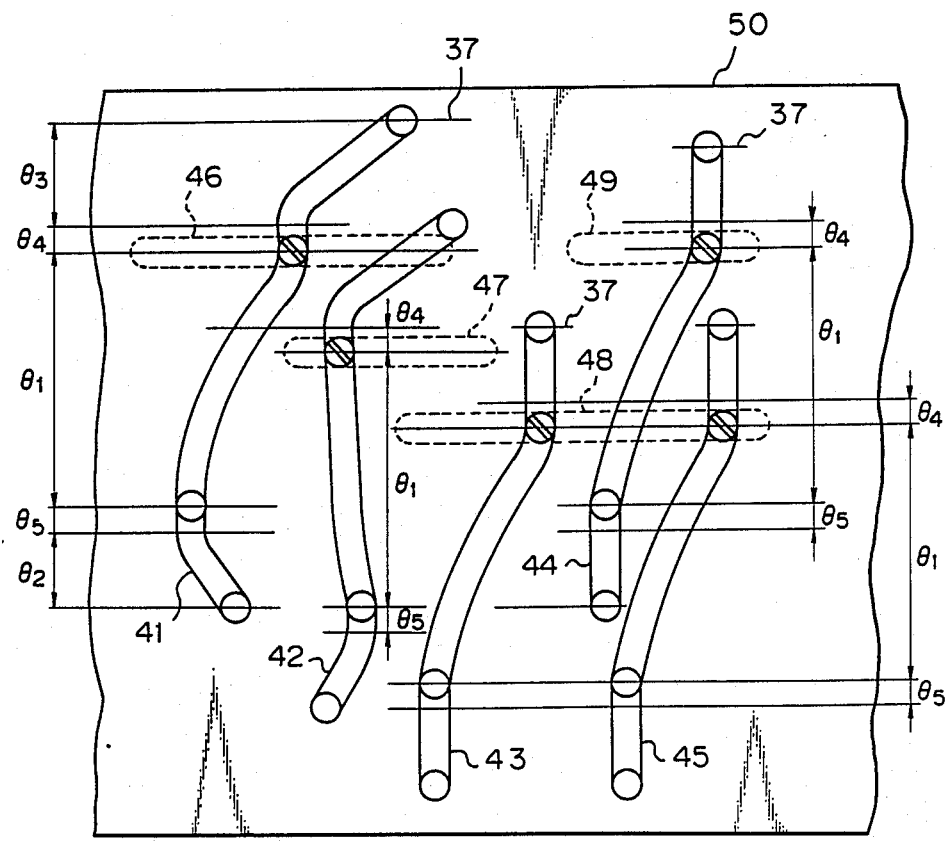
FIG. 5 is a developed view of a cam groove specifically illustrating the mechanical characteristic shown in FIG. 4.

FIG. 5 is a developed view for cam grooves specifically illustrating the cam lines in FIG. 4. Identical portions as those in FIG. 4 carry the same reference numerals, for which the explanations are omitted. In FIG. 5, are shown cam grooves 41-45 corresponding to the cam lines 32-36 respectively and linear cam grooves 46-49 for translating the movement of the lens groups 2a-the lens group 5e into that of the direction along the optical axis. There are also shown a cam frame 50, and regions $\theta_4$ and $\theta_5$ corresponding to the WIDE position and the TELE position respectively, in which the positions of the lens groups 2a-2e are not changed and the focal length does not change when the cam frame is rotated.

Figure 8B:
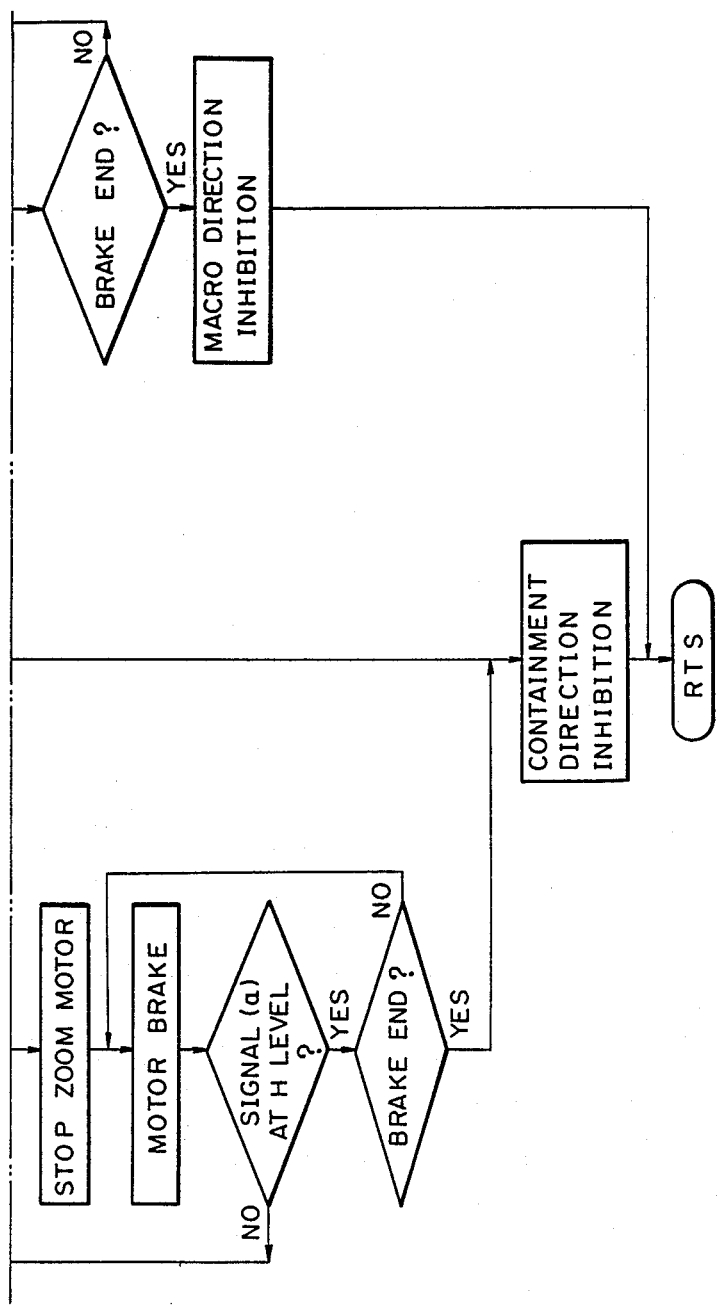

FIG. 6 through FIG. 14 are flow charts illustrating the operation sequence of the device shown in FIG. 1, in which FIG. 6 and FIG. 7 show the main routine and FIG. 8 through FIG. 14 show sub-routines used in the main routine shown in FIG. 6 and FIG. 7, the content for the respective figures being: FIG. 8 for the WIDE position control, FIG. 9 for the TELE position control, FIG. 10 for the macro position control, FIG. 11 for the containment position control, FIG. 12 for the containment position retraction, FIG. 13 for the macro position retraction and FIG. 14 for the sub-routine by interruption the content of which is the stop control in the zooming region (at both ends) (hereinafter simply referred to as "ZBM"). The interrupt is actuated when the switch 17 is operated and the signal (b) or the signal (c) turns to the L level.

Figure 9:
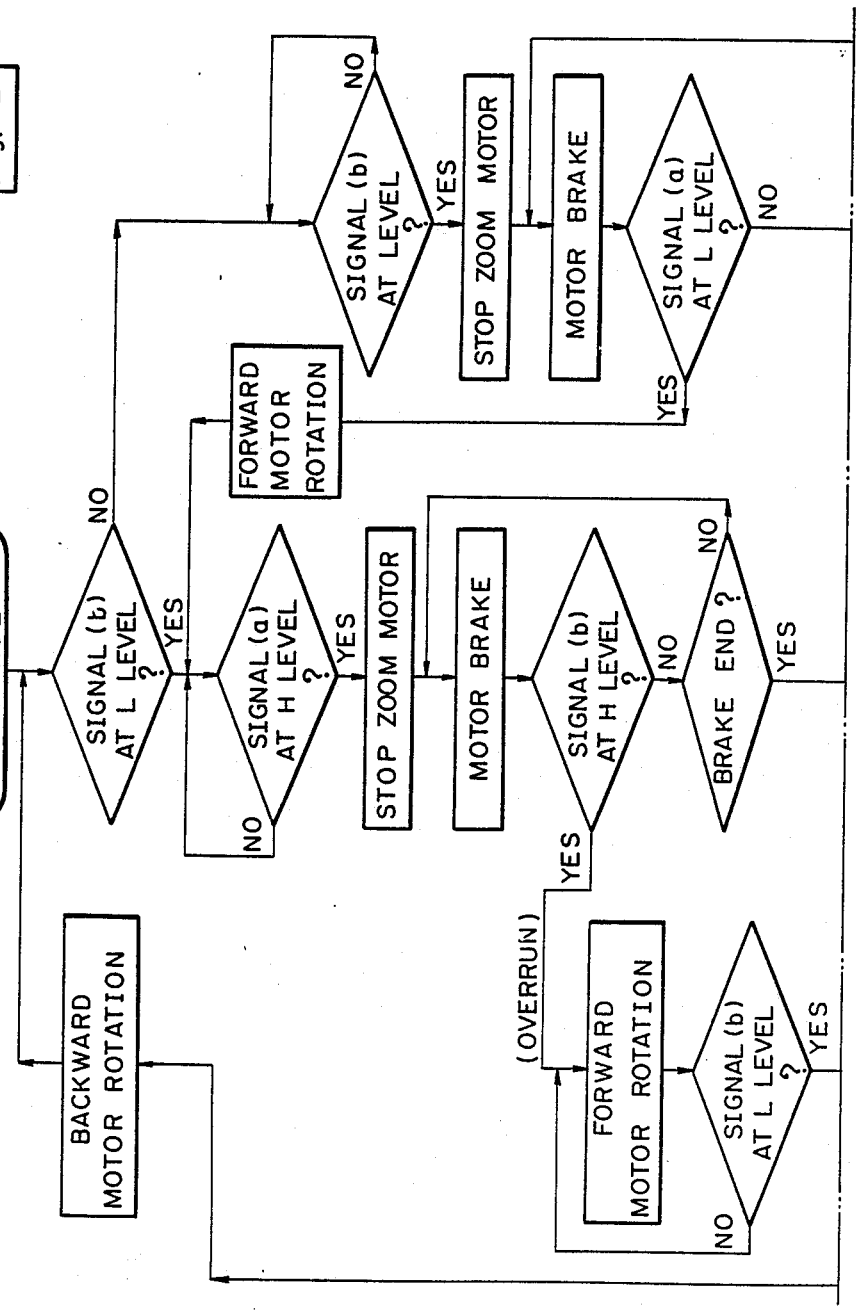
Figure 9B:
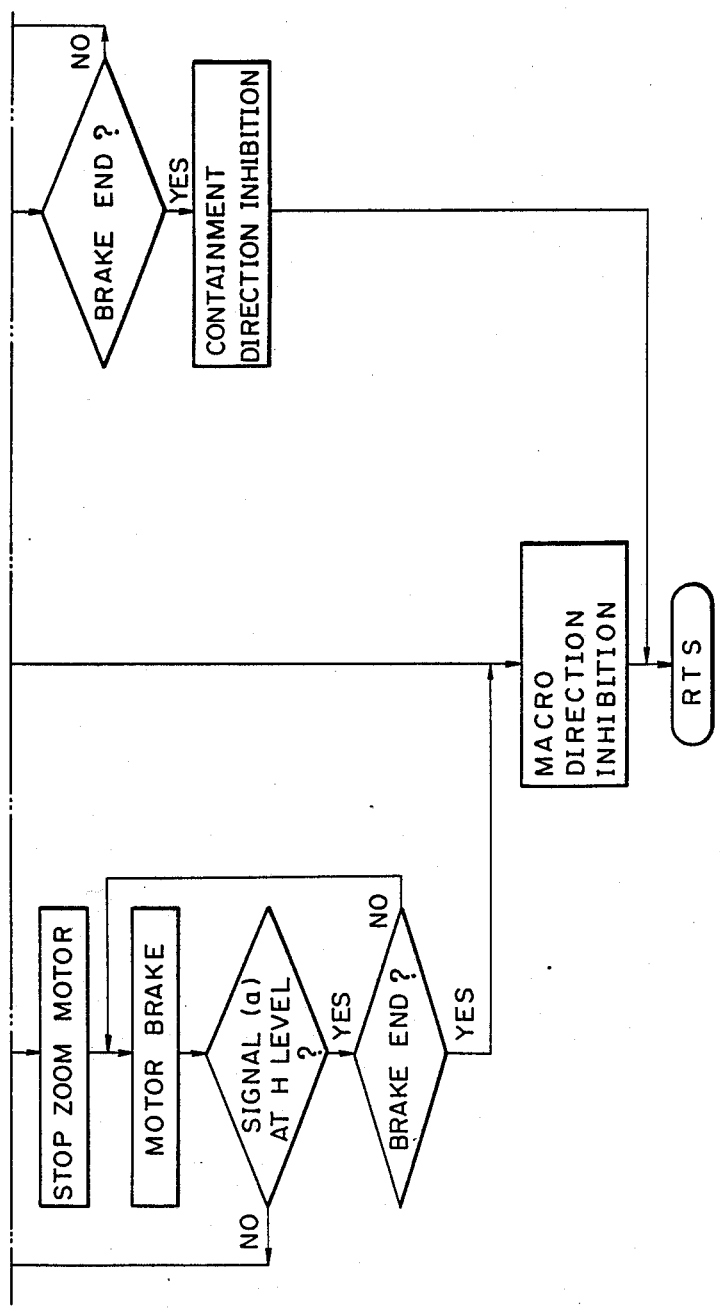
Figure 13:
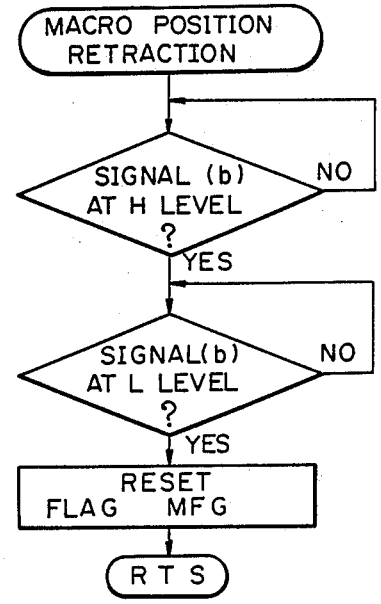

The operation of the main routine shown in FIG. 6 and FIG. 7 is adapted to be started at the instance when the switch 15 or the Z/M changing switching 16 is actuated (closed). Since the constitutions shown in FIG. 6 through FIG. 14 are described in conjunction with the following explanations for the operation, they are not described here. In the sub-routines shown in FIG. 8 through FIG. 13, the constitution in FIG. 9 is the same as that in FIG. 8 when replacing the signal (c) with the signal (b), the forward motor rotation with the backward motor rotation, the backward motor rotation with the forward motor rotation, the macro direction inhibition with the containment direction inhibition and the containment direction inhibition with the macro direction inhibition respectively in FIG. 8, the constitution shown in FIG. 11 is the same as that in FIG. 10 when replacing the signal (b) with the signal (c) and the macro flag with the containment flag respectively in FIG. 10, and the constitution of FIG. 13 is the same as that in FIG. 12 when replacing the signal (c) with the signal (b) and the containment flag with the micro flag respectively in FIG. 12.

Now the operation of this embodiment having thus been constituted will be explained referring to the flow chart of the main routine shown in FIG. 6 and FIG. 7. For making the explanation not complicate, explanation will be made, at first, by dividing the region setting operation for setting the region into respective cases where the switch 15, the switch 16a, and the switch 16b are actuate (closed) and, further, dividing the cases depending on the positions of the brush 6 before the operation in FIG. 2 and FIG. 3.

(i) Region Setting Operation by Containment Switch (a) At the containment approaching position It is assumed here that the brush 6 is at the position $P_1-P_2$. Then, if the switch 15 is actuated, the switch judging unit 18 judges the signal as the input from the switch 15 to start the region setting operation. That is, the flow chart is started at START in FIG. 6. At first, the mode detection section 9 in the overall distinguishing unit 8 checks the signal (a) at the first conditional branch "Zooming Region?". As can be seen from FIG. 3, since the signal (a) takes the H level only in the region $P_3-P_{10}$ and takes the L level in the present position $P_1-P_2$, it is judges as not in the zooming region and the flow is branched to NO. At the next conditional branch "Containment Position?", the mode detection section 9 also checks the flag SFG. Since the flag is reset in a case where the brush is not at the position $P_0-P_1$ as described above, the flow is branched to NO. In the same way, at the next "Macro Position?", the flag MFG is checked and, since the flag is reset by the same reason, the signal (NG) is outputted and the flow branches into NO. The operations from START up to this step is referred to as "predetermined position checking operation". That is, by the predetermined position, checking operation, since it can be recognized that the optical system 2 is not at the containment position, macro position or zooming region as the predetermined position, the signal (NG) indicating this has been outputted. Such a state where the optical system 2 is not at the predetermined position can not occur in view of the design, but the system may be stopped at a not expected position, for example, by the effect of external force (manually pushing to the zooming optical system 2) or due to obstacles.

Then the in able judging unit 11 checks the signal level of inputted other signal (b) and the signal (c) at the next conditional branch "Distinguishing Disable?" from the instance receiving the signal (NG) from the overall distinguishing unit 8. That is, since it has already been recognized that the brush 6 situates at either of $P_1-P_3$ or $P_{10}-P_{12}$ by the checking operation for the predetermined position, it is checked as to whether both of the signals (b) and (c) are at the H level or not. That is, in the present case, since both of them are at the H level, it is impossible for the judgment (distinguishing) as to whether the brush 6 is situated or not at the position $P_1-P_2$ or $P_{11}-P_{12}$. Accordingly, the disable judging unit 11 outputs the signal (d) indicating this state and the search unit 12 receiving this signal (d) outputs the signal (f) at the next "Drive to Macro". Then, the zoom controlling unit 21 receiving this signal (f) causes the motor Mz to rotate and drives the optical system 2 to the macro side by way of the driving unit 4. Correspondingly, while the brush 6 situated between the position $P_1-P_2$ starts to move toward $P_3$, it is still within the position $P_1-P_2$. The flow checks as to whether the brush 6 reaches the position $P_{12}-P_{13}$ or not and at the next conditional branch "Reach Macro?" then branches into NO. Then, in the next conditional branch "Containment Continuation Section?", it checks as to if the brush 6 transfers to the containment continuation section $P_2-P_3$ and branches into NO. Further, it checks at the next conditional branch "Macro Continuation Section?" as to whether the brush 6 is situated in the macro continuation section $P_{10}-P_{11}$ or not, then branches into NO and, thereafter, returns again to the conditional branch "Reach Macro?" (the operation of the loop is hereinafter referred to as "disable check loop"). Now, when the brush 6 situated so far within $P_1-P_2$ transfers toward $P_3$ and passes over the position $P_2$, the flow branches from "Containment Continuation Section?" in the disable check loop into YES, in which the disable judging unit 11 stops outputting the signal (d). Since the search unit 12 not receiving the signal (d) any more stops outputting the search signal (f), the zooming controlling section not receiving the search signal (f) any more causes the rotation of the motor Mz to stop in the next "Stop Zoom Driving", to thereby stop the driving for the optical system 2 and the brush 6.

Then, at the conditional branch "Containment Switch Closed?", since the containment switch 15 is actuated (closed) in this case, the flow branches into YES, and drives at the next "Focus Driving" the lens group 3 toward ∞ position by a focus driving unit not illustrated. This is the operation for aligning the direction of the movement of the lens group 3 when the lens group 3 is driven to the focusing position in the zooming region and the macro region. The "Focus Driving" on the flow chart is to be described later. Then, in the next "Driving to Containment Position", the zoom controlling unit 21 receives the signal (e) showing that the brush 6 situates within the section $P_2-P_3$ and the signal (j) showing that switch 15 is closed by way of the inhibition unit 20 and rotates the motor Mz so that the optical system 2 is driven toward the containment position. Then, the flow chart transfers at the next subroutine "Containment Position Control" to FIG. 11. in which the overall distinguishing unit 8 checks as to if the signal (c) is at the H level or not at the conditional branch "Signal (c) at H level?" and continues to branch into NO till it turns to the H level while the brush 6 is driven from the position near $P_2$ toward $P_0$. The flow branches at the instance passing over $P_2$ from the conditional branch into YES and the zoom controlling unit 21 interrupts the power supply to the motor Mz at the next "Zoom Motor OFF". However, the motor Mz continues idle rotation by the inertia. The overall distinguishing unit 8 checks the signal level of the signal (c) in the same manner at the next conditional branch "Signal (c) is at L level?" and monitors the fall of the signal level of the signal (c) to the L level upon the brush 6 passing $P_1$. The flow branches into YES upon the brush 6 passing $P_1$ to recognize the arrival of the brush 6 to the containment position $P_0$–$P_1$ and stops the rotation of the motor Mz by applying electromagnetic brake at "Motor Brake". Then, at the next "Set Flag SFG" the overall distinguishing unit 8 sets and maintains the flag SFG, and memorizes that the optical system 2 is in the containment section as one of the predetermined positions. The flow returns again at RST to the main routine in FIG. 6 and completes the region setting operation at END. The operations from the "Focus Driving" to END described above are referred to as containment setting operation.

(b) At the MACRO approaching position

Explanation is to be made to the setting operation when the switch 15 is actuated in a case where the optical system 2 and the brush 6 are at a position $P_{11}$–$P_{12}$. The operations are the same as those in (i) (a) as to starting from START in FIG. 6, branching at the conditional branch "Distinguishing Disable?" in the predetermined position checking operation into YES, starting the driving for the optical system 2 to the MACRO side and then arriving at the disable check loop described above. Now explanating more in detail the content at the conditional branch "Reach MACRO?" in the disable check loop, the flow goes to the sub-routine shown in FIG. 10 and, since the brush 6 is at the position $P_{11}$–$P_{12}$ and the MACRO region signal (b) is at the H level, the overall distinguishing unit 8 branches at the conditional branch "signal (b) H Level?" into YES, interrupts the power supply to the motor Mz at the next "Zoom Motor OFF" in the same manner as described above. Since the signal level turns to the L level upon passing $P_{12}$, it is monitored at the next conditional branch "Signal (b) at L level?". The motor is stopped at the "Motor Braking" at the instance arriving at the position $P_{12}$–$P_{13}$, and the overall distinguish unit 8 sets the flag MFG at the next "Flag MFG Set" to memorize that the optical system 2 is at the MACRO position as one of the predetermined positions. The flow returns again at RTS to "Reach MACRO?" in FIG. 6 and branches into YES since it arrives at the MACRO position. Now, the flow transfers from the next (3) in FIG. 6 to the (3) in FIG. 7, branches at the next "Containment Switch closed?" into YES, executes "Focus Driving". Then, at the next "Driving To TELE Position" the zoom controlling unit 21 starts the driving for the brush 6 to a position $P_8$–$P_{10}$ while referring to the region signal (e) indicating that the brush 6 is situated at a MACRO position $P_{12}$–$P_{13}$, and the state signal (j) indicating that the switch 15 is closed inputted by way of the inhibition unit 20. Referring to the operation more specifically, it comprises in this instance the sub-routine shown in FIG. 13 "MACRO Position Retraction" and sub-routine in FIG. 9 "TELE Position Control". Referring at first simply from the MACRO position retraction operation in FIG. 13, it checks the signal (b) that changes as the brush 6 situated so far at the position $P_{12}$–$P_{13}$ is driven to the TELE position side, resets the previously set flag MFG at the instance when the brush 6 passes the H level portion in a position $P_{11}$–$P_{12}$ and indicates that the brush 6 is no more at the MACRO position $P_{12}$–$P_{13}$. Then, the flow transfers to the sub-routine for the TELE position control shown in FIG. 9, and the overall distinguish unit 8 checks at the first conditional branch "Signal (b) at L level?" if the optical system is in the section $P_{10}$–$P_{11}$ or not, and then the flow branches into YES. Then, at the next conditional branch "Signal (a) at H Level?", the overall distinguish unit 8 monitors the rise of the signal (a) at $P_{10}$. When the brush 6 reaches $P_{10}$, the flow branches into YES, stops the rotation of the motor Mz and further applies electromagnetic braking. At the conditional branch "Signal (b) at H Level?", the overall distinguish unit 8 checks the signal (b) and, if the stop position of the brush 6 is out of the TELE position $P_8$–$P_{10}$, it judges the generation of over-run and branches into YES. While on the other hand, if the brush 6 is within the position $P_8$–$P_{10}$, the flow branches into NO, branches into YES at conditional branch "Brake End?", inhibits the driving for the optical system 2 to the MACRO side regarding switch 17 at the "MACRO Direction Inhibition" and then again returns at RTS to FIG. 7.

The operation after branching into YES at the conditional branch "Signal (b) at H LEVEL?" in FIG. 9 by the generation of the over-run is conducted for compensating the over-run and finally stopping within the position $P_8$–$P_{10}$. Since it has no direct concerns with the feature of the present invention, detailed explanations therefor are omitted. Furthermore, the compensating operation is conducted in the same way also in the sub-routine (WIDE position control) in FIG. 8.

Now returning to the main routine in FIG. 7, the macro chart advances from "Driving to TELE Position" to the next conditional branch "Containment Switch Closed?" (the operation for the "Focus Driving?" and "Driving to TELE Position" are hereinafter referred to as "TELE Position Setting Operation"). Then, the flow branches at the conditional branch into YES and again starts to drive the optical system 2 by way of the "Focus Driving" and drive the brush 6 at "Driving to WIDE Position" from the position $P_8$–$P_{10}$ to the position $P_3$–$P_5$. The control for the stopping at the WIDE position in this case is conducted by the subroutine (WIDE position control) in FIG. 8. The overall distinguishing unit 8 checks the level of the signal (c) at the conditional branch "Signal (c) at L Level?" shown in FIG. 8 and, since the optical system 2 has been started only just before, if the brush 6 is assumed to be situated near $P_7$ for instance, since the signal (c) is at the H level, the flow branches at the conditional branch into NO and then the overall distinguish unit 8 checks at the next conventional branch "Signal (c) at L Level?" the region signal (c) in the same way and monitors the fall of the signal (c) at $P_5$ while continuously branching into NO. When the brush 6 reaches $P_5$, the flow branches into YES to stop the motor Mz and apply braking. Then, the overall distinguish unit 8 checks at "signal (a) at L Level?" if the signal (a) falls or not, that is, it checks if the brush 6 stops within the position $P_3$–$P_5$, and then the flow branches into YES if the over-run is generated. In this case, the flow branches into NO indicating that the over-run does not occur, branches at "Brake End?" into YES and inhibits at "MACRO Direction Inhibition" the re-driving for the optical system 2 to the same direction (MACRO direction) as the direction indicated by the zoom change switching 17. Then, it returns at RTS to the main routine shown in FIG. 7. Now, the flow returns to FIG. 7, starts driving from the position $P_3$–$P_5$ to the position $P_0$–$P_2$ at the next "Drive to Containment Position" and conducts the control for stopping at the containment position by the sub-routine shown in FIG. 11. The operation from "Focus Driving" by way of "Driving to WIDE Position"to "Driving to Containing Position" is referred to as "Via Zoom Containment Setting Operation". When the via zoom containment setting operation has been completed, the flow branches at the next "Containment Switch Closed?" into YES thereby completing the region setting operation at END. That is, as can be seen from (i) (a) and (i) (b), even at the near containment position $P_1$–$P_2$ and the near macro position $P_{11}$–$P_{22}$ where the brush 6 is unable to recognize the region, the brush 6 is once retracted to the section $P_2$–$P_3$ and the position $P_{12}$–$P_{13}$ capable of region distinguishment by the actuation of the switch 15 and, thereafter, the brush 6 is driven to the containment position $P_0$–$P_1$ to establish the position setting of the optical system 2.

(c) At MACRO position

When the switch 15 is actuated in the case where the brush 6 is at the position $P_{12}$–$P_{13}$, the flow chart for the region setting operation is initiated from START in FIG. 6 branches into YES at the conditional branch "MACRO Position?" in the predetermined position checking operation, and reaches (3). The operations hereinafter are the same as those after (3) in (i) (b) described above.

(d) In MACRO continuation section

In the region setting operation in this case, the flow branches into NO at the conditional branch "Distinguishing disable?" within the predetermined position checking position shown in FIG. 6, advances to the disable check loop, branches at the conditional branch "MACRO Continuation Section?" within the loop into YES and, by way of the next "Stop Zoom driving" (since the motor Mz has not yet been driven in this case, nothing is substantially done), branches into YES at the next conditional branch "Containment Switch Closed?", executing "Focus Driving" and reaches driven to the position $P_8$–$P_{10}$ by the sub-routine "TELE Position Control" in FIG. 9 described above, the flow reaches (1). Then, it transfers to (1) in FIG. 7, branches into YES at "Containment Switch Closed?". Subsequent operations are the same as the via room containment setting operation in (i) (b) described above and the succeeding operations.

(e) In the containment continuation section

Also in this case, the flow branches into NO at the conditional branch "Distinguishing Disable?" in the predetermined position checking operation in FIG. 6, branches into YES at the conditional branch "Containment Continuation Section?" in the disable check loop, then by way of the next "Stop Zoom Driving" branches into YES at the next conditional branch "Containment Switch Closed?", and executes the containment setting operation, to complete the operation.

(f) At the containment position

The flow branches into YES at the conditional branch "Containment Region?" in the predetermined position checking operation in FIG. 6, transfers to (2) in FIG. 7, branches into YES at the conditional branch "Containment Switch Closed?" and completes the operation at END. That is, since it has already been situated at the containment position, nothing is resulted even if the containment switch 15 is actuated.

(g) In the zooming region

When the brush 6 is situated in the region $P_3$–$P_{10}$, the flow branches into YES at the first conditional branch "Zooming Region?" in FIG. 6, reaches (1) in FIG. 6 and then transfers to (1) in FIG. 7. The subsequent operations are the same as those after (1) in (i) (d) described above.

Explanation is to be made to the region setting operation in a case where the Z/M change switch 16 is actuated for each of the cases depending on the present position of the brush 6 as described above. Explanation is at first made to a case where only the switch 16$b$ of the Z/M change switch 16 is actuated (closed).

(ii) Region Setting Operation by Macro Switch (a) At the contamination approaching position Assuming that the brush 6 is at $P_1$–$P_2$ and the switch 16$b$ is actuated, the region setting operation in this case begins at START in FIG. 6, then, by way of the predetermined position checking operation and "Driving to MACRO" described above, advances to the disable checking loop. When the brush 6 reaches $P_2$, the flow branches into YES at "Containment Continuation Section?" and executes "Stop Zoom Driving" in the same manner as the operations (i) (a) above. Then, in the next conditional branch "Containment Switch Closed?", since the switch 15 is not actuated now, the flow branches into NO and reaches (5). Then, the operation transfer to (5) in FIG. 7, and the flow executes "Focus Driving" and then advances to "Driving to WIDE Position". Then, after starting the driving of the optical system 2 to the WIDE position side, the flow transfers to the sub-routine (WIDE position control) in FIG. 8. The overall distinguishing unit checks the level of the signal (c) at the first conditional branch "Signal (c) L Level?" in FIG. 8. Since the brush 6 is at the position slightly passing over $P_2$ toward $P_3$, the flow branches into YES, and the overall distinguish unit monitors the rise of the signal (a) at $P_3$ at the next conditional branch "Signal (a) at H Level?". The flow branches into YES at the instance the brush 6 arriving at $P_3$, stops the motor Mz, further applies brake, branches into NO at "signal (c) at H Level?" assuming that there is no overrun, branches into YES at "Brake End?", inhibits the zoom ratio change switch 17 from driving the optical system 2 to the containment position side by "Containment Direction Inhibition", thereby prevents the escape of the optical system 2 from the zooming region by the misoperation etc. of the down switch 17$b$. Then, the flow again returns RTS to the main routine of FIG. 7. Now, the flow returns from RTS to the main routine in FIG. 7, then advances from "Driving to WIDE Position" to the next conditional branch "Containment Switch Closed?", branches there into NO and then branches into YES at the next conditional branch "Switch to MACRO?". Then, after executing "Focus Driving", the flow advances to "Driving to TELE Position", against starts to drive the brush 6 from the WIDE position $P_3$–$P_5$ to the TELE position $P_8$–$P_{10}$ and transfers to the sub-routine (TELE position control) in FIG. 9. At the first conditional branch "signal (b) at L Level?" in FIG. 9, the flow checks the level of the signal (b) and, since the optical system 2 is at the position $P_3$–$P_5$, the flow branches into NO and upon arrival of the brush 6 at $P_8$, stops the motor Mz, applies the braking to stop it at the position $P_8$–$P_{10}$, inhibits the zoom ratio change switch 17 from driving the optical system 2 to the containment side by "Containment Direction Inhibition" assuming that there is no over-run and returns at RTS to the main routine in FIG. 7. After returning to the main routine in FIG. 7 and starting to drive the optical system 2 having been situated at the TELE position to the macro side at the next "Driving to MACRO Position", the flow stops the system at the position $P_{12}$–$P_{13}$ by the sub-routine (MACRO position control) in FIG. 10, sets the flag MFG, returns at RTS to FIG. 7 and then advances from "Driving to MACRO Position" to the next "Containment Switch Closed?". Then flow branches into NO and then branches at the next conditional branch "Switch to MACRO?", and then proceeds to the sub-routine "MACRO Focus" (not illustrated in the drawing). In this sub-routine, photographing operations, etc. including the focusing operation are executed, for example, if the release switch (not illustrated) has been operated and advances to the next END to complete the region setting operation if it is not operated. The sequence from "Focus Driving" by way of "Driving to TEE Position" to "Driving to MACRO Position" is referred to as "via zoom MACRO setting operation".

(b) At the MACRO approaching position

The flow branches into YES at the conditional branch "Distinguish disable?" in the predetermined position checking operation of FIG. 6, executes the next "Driving to MACRO" and, since the zoom optical system 2 reaches the MACRO Position while repeating the disable check loop, branches into YES at "Reach MACRO?", branches into No at "Containment Switch Closed?", branches into YES at the next "Switch to MACRO?", and then by way of the sub-routine "MACRO Focus" completes the region setting operation at END.

In this way, even when the brush 6 is at the distinguishing disable position $P_1$–$P_2$ or $P_{11}$–$P_{12}$ and the switch 16b is actuated, if it is at the containment approaching position $P_1$–$P_2$, the optical system 2 is once retracted to the containment continuation section capable of distinguishment and then driven again and set to the MACRO position. While on the other hand, if the optical system 2 is at the MACRO approaching position $P_{11}$–$P_{12}$, the once retracted position itself is the position to be set. The setting operation can be obtained surely in any of the cases above.

(c) At the MACRO position

In this case, the flow branches into YES from the conditional branch "MACRO Position?" of the predetermined position checking operation in FIG. 6, reaches (3) and then transfers to (3) in FIG. 7. Subsequent operations are identical with those after (3) in (ii) (b).

(d) In the MACRO continuation section

Figure 10:
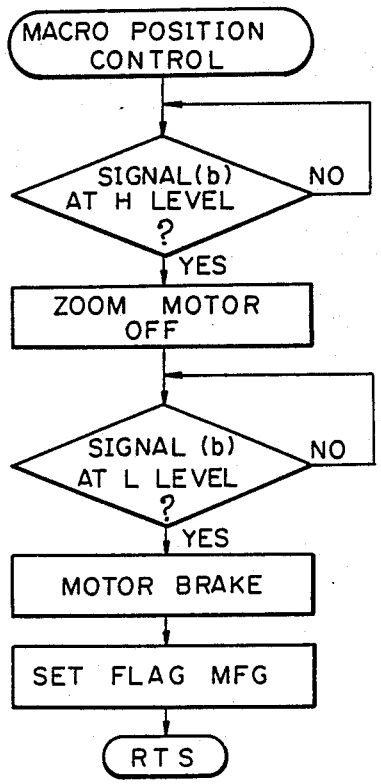
Figure 11:
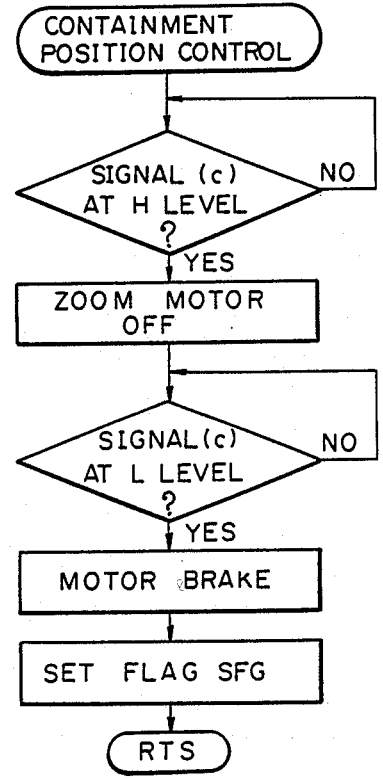
Figure 12:
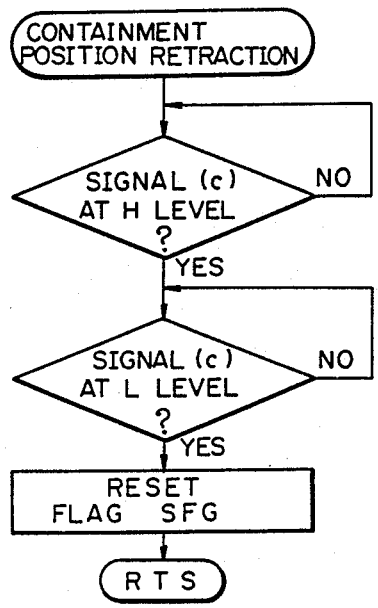

The flow branches into NO at "Distinguishing Disable?" in the predetermined position checking operation, transfers to the disable check loop, branches into YES at "MACRO Continuation Section?" in the disable check loop, then by way of "Stop Zoom Driving", branches into NO at "Containment Switch Closed?", then branches into YES at the next conditional branch "Switch to MACRO?", starts driving of the optical system 2 to the MACRO position side at the next "Driving to MACRO Position" and, thereafter, executes the sub-routine "MACRO Position Control" shown in FIG. 10 to set the brush 6 to the MACRO position $P_{12}$–$P_{13}$. The operations after (4) are the same as those as described above.

(e) In the containment continuation section

The flow branches into NO at "Distinguishing Disable?" in the predetermined position checking operation in FIG. 6, transfers to the disable check loop, branches into YES at "Containment Continuation Section?" in the disable check loop, then by way of "Stop Zoom Driving", branches into NO at the next "Containment Switch Closed?", reaches (5), transfers to (5) in FIG. 7, drives the brush 6 to the position $P_3$–$P_5$ by "Focus Driving" and "Driving to WIDE Position", branches into NO at the next "Containment Switch Closed?", branches into YES at the next "Switch to MACRO?", drives from the WIDE position to the TELE position and further, to the MACRO position by the next via zoom MACRO setting operation. Thereafter, it branches at "Containment Switch Closed" into NO, by way of the sub-routine "MACRO Focus" and reaches END to complete the region setting operation.

(f) At the containment position

The flow branches into YES at "Containment Position?" in the predetermined position checking operation in FIG. and, transfers from (2) in FIG. 6 to (2) in FIG. 7. Then, the flow branches into NO at the next "Containment Switch Closed?". The subsequent operations are the same as those after (5) in (ii) (e) described above.

(g) In the zooming region

The flow branches into YES at the first conditional branch "Zooming Region?" in FIG. 6 and then transfers from (1) in FIG. 6 to (1) in FIG. 7. Then, the flow branches into NO at "Containment Switch Closed?", and further branches into YES at "Switch to MACRO?". The subsequent operations are the same as those after branching into YES at "Switch to MACRO?" in (ii)(e).

(iii) Region Setting Operation by Zooming Switch

This is the region setting operation in the case where only the zooming switch 16a of the Z/M changing switch 16 is actuated. Since it is similar to (i) and (ii) described above, explanation is to be made only to one typical case.

It will be apparent that the operations are different from those in (ii) in that the flow branches into NO at all the conditional branches "Switch to MACRO?" in FIG. 6 and FIG. 7. The contents of the sub-routine "Zooming Focus" in FIG. 7 are the focal point setting operation for setting the focal length by both of the focus control of the focusing lens group 3 and the zooming ratio changing switch 17 and the photographing operation by a release switch not illustrated, etc., in a case where the brush 6 is in the region $P_3$–$P_{10}$. "Zooming Focus" will be described more specifically in the second embodiment of the present invention.

Assuming that the brush 6 is at the containment approaching position $P_1$–$P_2$, and only the switch 16a is actuated. The flow executes the predetermined position checking operation and the next "Driving to MACRO", and then transfers to the disable checking loop in FIG. 6. At the instance when the brush 6 passes over $P_2$ and the signal (c) falls, the flow branches into YES at "Containment Continuation Section?" in the disable checking loop and, after executing the next "Stop Zoom Driving", branches into NO at the next "Containment Switch Closed?" and reaches (5). Then, the flow transfers to (5) in FIG. 7 and set the brush 6 from $P_2$ to the WIDE position $P_3$–$P_5$ by the next "Focus Drive" and "Driving to WIDE". Then, the flow branches into NO at the next "Containment Switch Closed?", further branches into NO at "Switch to MACRO?", advances to the subroutine "Zooming Focus", executes predetermined operation and then reaches END to complete the operation. Referring to only the results of the operations of other cases, when the brush 6 is initially in the region $P_{10}$–$P_{13}$, it is to be set as the result at the position $P_8$–$P_{10}$ in the zooming region, if it is initially in the region $P_0$–$P_3$ it is to be set at the position $P_3$–$P_5$ of the zooming region. If it is initially in the region $P_3$–$P_{10}$, nothing is done in due course.

Explanation will be made to the focal point setting operation by the switch 17, particularly, the operation near the boundaries of the regions. Accordingly, this is the operation within the sub-routine "Zooming Focus" in FIG. 7. It is assumed here that the brush 6 is at an arbitrary position in the midway of the zooming region. It is assumed here that the switch 17b, for example, is actuated. The switch judging unit 18 generates a state signal (j) indicating the direction of the zoom ratio up by way of the inhibition unit 20. Then, the zoom controlling unit 21 receiving this signal (j) confirms that the optical system 2 is in the zooming region referring to the signal (e) and then starts the driving for the zooming optical system 2 to the TELE position side by way of the zoom driving unit 4. The focal length detection unit 7 applies A/D conversion to the inputted information (Zp) by way of the A/D converter 7a and outputs it as (Zp). If the optical system 2 is a varifocal lens, the compensation amount for the optical system 2 is calculated in the calculation section 7b and the result is outputted as the calculation output (k). Particularly, the calculation output (k) is outputted also to the focus driving unit not illustrated to properly conduct shift compensation while interlocking with the zoom controlling unit 21. Now, since the stop/reverse movement judging unit 14 for receiving the signal (e) outputted from the overall distinguishing unit 8 outputs none of the reverse signal (g), the stop signal (h) and the inhibition signal (i) since the zooming optical system 2 is yet within the zooming region. When the optical system 2 is driven from the intermediate position and reaches the position $P_8$ in which the signal (b) falls, the sub-routine ZMB is actuated by the interrupt in FIG. 14. In this case, the stop/reverse movement judging unit 14 stores the latest driving direction of the optical system 2 to its internal memory MR. In "Zoom Motor Brake" in FIG. 14, the boundary end detection section 10 of the overall distinguishing unit 8 outputs the region signal (e) indicating the detection of $P_8$ as one end of the boundary region. The stop/reverse movement judging unit 14 receiving the signal (e) outputs the stop signal (h). Then, the zoom controlling unit 21 receiving the signal (h) applies electromagnetic braking to the motor Mz after interrupting the electric supply thereto. At the next conditional branch "Brake End?", the flow branches into NO for a predetermined period to continue the braking operation and then branches into YES. Then, at the next conditional branch "Zooming Region?", the stop/reverse movement judging unit 14 receives the signal (e) and conducts checking as to whether the optical system 2 situates within the zooming region or not, that is, judges as to whether the over-run has been generated and the brush 6 has intruded into the MACRO region over-riding $P_{10}$ as the boundary of the TELE position. In this case, it is assumed that over-run did not occur and the flow branches into YES. At the next conditional branch "Signal (c) at L Level?", since the brush 6 stops now within the TELE position $P_8$–$P_{10}$, the overall distinguishing unit 8 checks the level of the signal (c) and the flow branches into NO. Then, at the next conditional branch "Signal (b) at L Level?", the unit 8 checks the level of the MACRO region signal (b) and the flow branches into YES. Then, at the next "MACRO Direction Inhibition", the stop/reverse movement judging unit 14 outputs the signal (h) for inhibiting the movement in the same direction as the previously stored latest driving direction (MACRO position direction). Then, the flow returns at RTI to the sub-routine "Zooming focus" in FIG. 7 and reaches END to complete the operation. Accordingly, even if the switch 17a is actuated again at this state, the signal (j) indicating the driving of the zoom-up direction, that is, indicating the driving to the MACRO position side outputted from the switch judging unit 18 is inhibited by the inhibition unit 20 and not outputted to the zoom controlling section 21. Accordingly, the optical system does not escape from the TELE position to the MACRO region.

Figure 14:
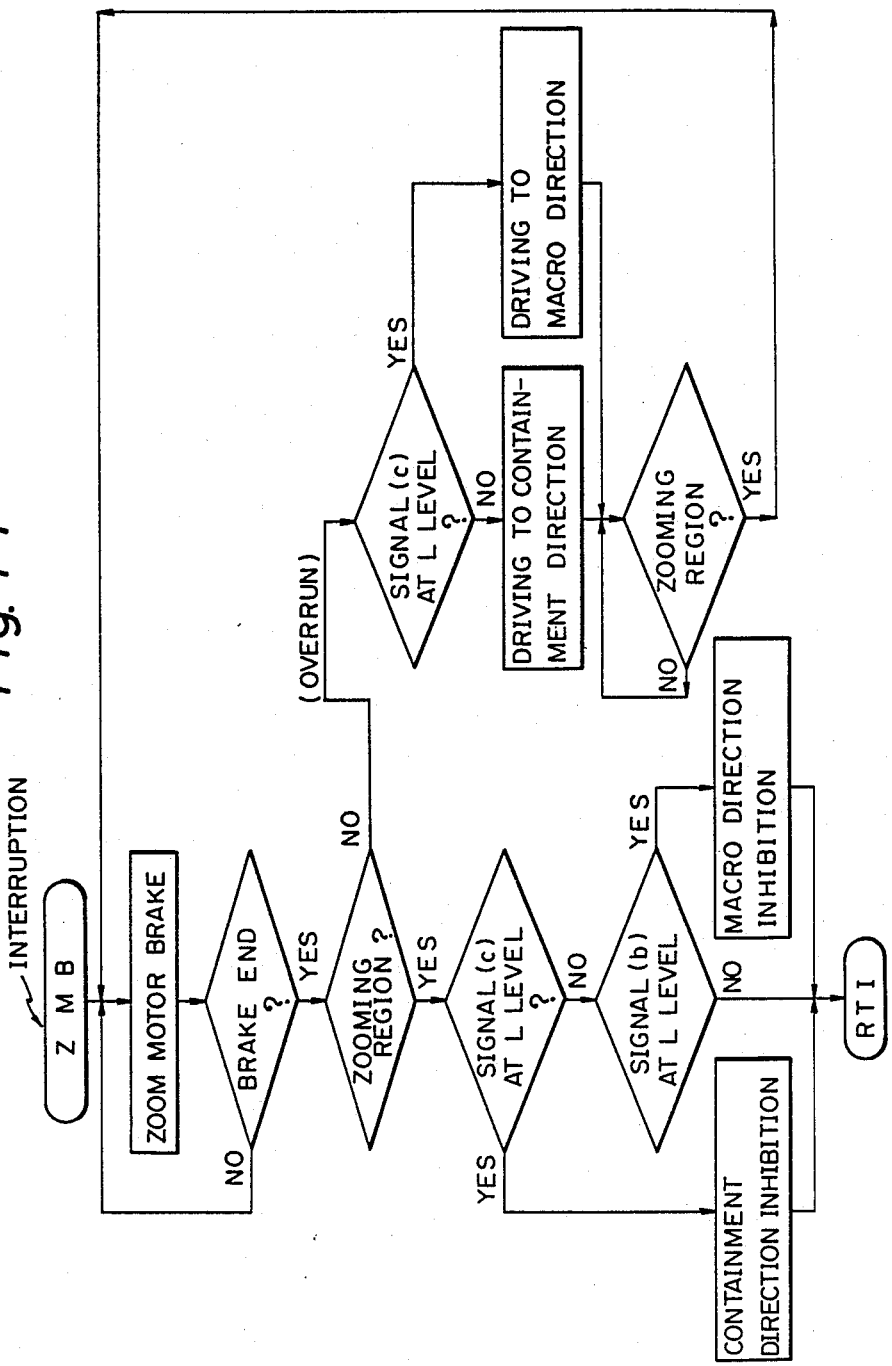

Now, explanation is to be made to the case where the flow has been branched into NO at the conditional branch "Zooming Region?" in FIG. 14. This is the case where over-run has occurred. The brush 6 is situated slightly exceeding the other end $P_{10}$ of the TELE position into the MACRO region. At first, the unit 8 checks the signal (c) at the conditional branch "Signal (c) at L Level?", the flow branches into NO since the signal (c) is at the H level and, the stop/reverse movement judging unit 14 outputs the signal (g) at the next "Driving to Containment Direction". Then, the zoom controlling unit 21 receiving this signal (g) rotates the zoom motor Mz reversely. Then, while repeating the checking operation branching into NO at the next "Zooming Region?" the brush 6 passes over $P_{10}$. When the brush 6 reaches the inside of the boundary region $P_8$–$P_{10}$ (TELE position), the flow branches into YES at the checking operation "Zooming Region?", again returns to the initial braking operation and the subsequent operations are the same as those explained above.

If the down switch 17b is actuated under this state where the brush 6 situates within $P_8$–$P_{10}$, the brush 6 is driven from the TELE position to the WIDE position, and the driving is continued while the actuated (closed) state of the down switch 17b is continued. Then, when the brush 6 arrives at the inside of the WIDE position $P_3$–$P_5$ as the boundary region, the sub-routine ZMB is actuated by the interrupt in FIG. 14 in the same manner as above to execute the same operations as described above to inhibit the redriving to the containment position side at "Containment Direction Inhibition" for stopping the brush 6 in the WIDE position $P_3$–$P_5$. Both of the inhibition state for containment direction and the inhibition state for the MACRO direction described above are released upon the actuation of the containment switch 15 or the Z/M changing switch 16.

As has been described above, according to this embodiment, it is constituted such that even if the brush 6 is situated at the containment approaching position $P_1$–$P_2$ or at the MACRO approaching position $P_{11}$–$P_{12}$ where the region distinguishment becomes disable, the brush 6 is forcively driven to the MACRO position side to retract into a distinguishable position and then the region is distinguished. Accordingly, although the distinguishing pattern unit 5 comprises the first pattern 5a - third pattern 5c with the number of stripes being as less as possible, it can provide a merit that the optical system 2 can surely be set to the containment position in the containment region, to the zooming region and to the MACRO position in the MACRO region as the predetermined position respectively.

Further, since the region distinguishment is executed after the retraction to the distinguishable positions, and at the same time the state for each of the switches 15 and 16 is checked to drive the optical system 2 for the optimum direction, the region setting can be conducted rapidly.

Further, since the brake pattern 31 and the Zp pattern 22 overlap at $P_6$-$P_7$ and the insulation portion $P_7$-$P_8$ of the first pattern 5a overlaps with the brake pattern 31, it can provide the merit that the information (Zp) can surely be prevented from becoming not continuous in the section $P_5$-$P_8$ and the effect of the insulation portion $P_7$-$P_8$ for separating the Zp pattern 22 and the ground pattern 24 can be eliminated.

Since each of the regions and each of the positions are distinguished by the signals outputted from the distinguishing pattern unit 5, it can provide a merit that the accuracy is higher as compared with the region distinguishment using a mechanical stopper, etc. and that the structure can be simplified into a compact form. Since the Zp pattern 22 is disposed in the first pattern 5a, it can provide a merit that the focal length in the zooming region can be detected.

Since it is so adapted that the WIDE position $P_3$-$P_5$ and the TELE position $P_8$-$P_{10}$ are corresponded to the balance region $\theta_1$ on the WIDE side and the balance region $\theta_5$ on the TELE side respectively and, in the case where the zoom ratio changing switch 17 is kept to be actuated even after the optical system 2 has reached the TELE position or the WIDE position as the end of the zooming region, the zoom motor Mz can be stopped by the application of brake at the instance when the optical system 2 reaches $P_5$ or $P_8$ which is one end for the WIDE position or the TELE position as the boundary region, it can provide a merit that the optical system 2 can surely be stopped in the boundary region and does not escape from the zooming region. Further, after the optical system 2 has reached the inside of the boundary region, since the driving in the same direction as the driving direction just before reaching the boundary region is inhibited, there can be provided a merit that the optical system 2 does not escape from the zooming region in the case, for example, where the switch 17 is actuated erroneously or intensionally.

In the case where the optical system 2 is escaped from the boundary region to the containment region or to the MACRO region by the over-run of the motor Mz, there can be provided the merit that the optical system 2 does not escape from the zooming region since the system is driven in the direction opposite to the over-run direction to finally stop in the boundary region.

Since the boundary regions are corresponded to the balance regions, there is the merit that the focal length does not change irrespective of the stopping position in the boundary regions.

The prevent invention is no way restricted to the above-mentioned embodiment but can be embodied into various modifications within the range not departing the gist thereof.

A mechanical stopper can be also equipped together at the positions $P_0$ and $P_{13}$ as the ends of the containment position $P_0$-$P_1$ and the MACRO position $P_{12}$-$P_{13}$ respectively.

The resistors 13 and 19 may be omitted if they are already disposed in the overall distinguishing unit 8 and the switch judging unit 18.

The input to the stop/reverse movement judging unit 14 is not restricted only to the region signal (e), but it may be so adapted to directly receive the zooming region signal (a), the MACRO region signal (b) and the containment region signal (c).

The region $P_0$-$P_3$ and the region $P_{10}$-$P_{13}$ are not always in adjacent with the respective position $P_3$-$P_5$ and the position $P_8$-$P_{10}$ of the zooming region, but they may be in adjacent with the opposite sides respectively. In short it is only necessary that the containment region is adjacent with the side of less moving amount for the optical system for containment.

Figure 15:
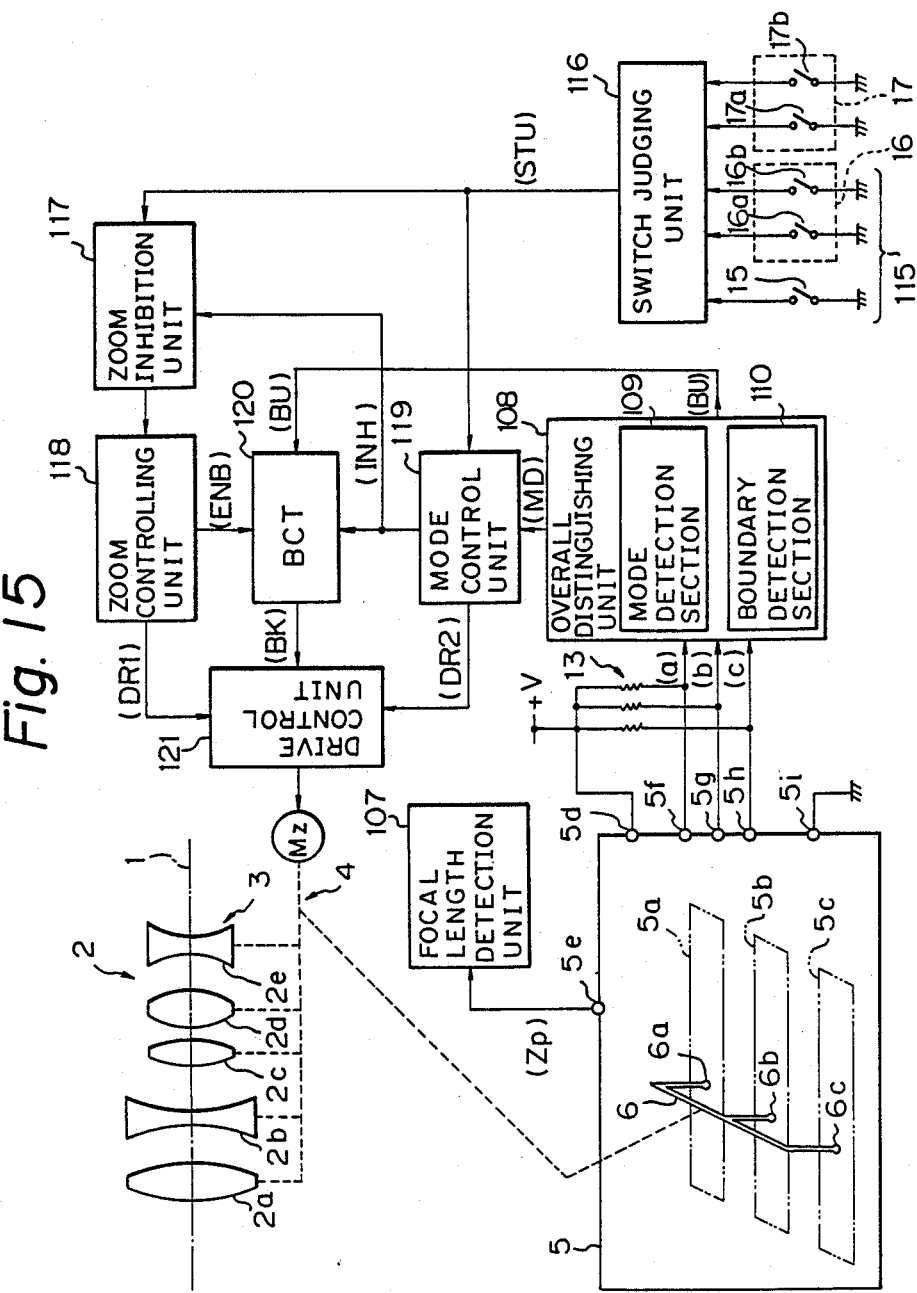
FIG. 15 is a block diagram illustrating the entire constitution of a zooming optical system control device as the second embodiment of the present invention.

FIG. 15 is a block diagram illustrating the entire constitution of a zooming optical system control device according to the third and the fourth inventions. In FIG. 15, identical portions with those shown in FIG. 1 carry the same reference numerals and the explanations for them are the same as have been described referring to FIG. 1. In the figure, there are shown a focal length detection unit 107 for receiving the focal length information (Zp), outputting the information after A/D conversion in an internal A/D converter, as well as conducting predetermined calculation for example, shift compensation and outputting the result for example, an amount of compensation; an overall distinguishing unit 108 for receiving each of the region signals (a), (b) and (c), detecting the region in which the optical system 2 is situated and outputting a mode signal (MD) and a boundary signal (BU); mode detection sections 109 and 110 constituting the overall distinguishing unit 108, the mode detection section 109 outputting the mode signal (MD) while the boundary detection section 110 outputting the boundary signal (BU). The containment switch 15 and the Z/M change switch 16 may some time correctively be referred as a mode switch 115. There are also shown a switch judging unit 116 to which respective one ends of the switches 15, 16 and 17 are connected and which judges the state of the switches and outputs the state as the state signal (STU); a zoom inhibition unit 117 for receiving the signal STU and outputting an inhibition signal (INH) while receiving the signal INH as described later and outputting the signal (STU) while not receiving the signal INH; a zoom controlling unit 118 for receiving the signal (STU) as the output from the zoom inhibition unit 117 to output a drive signal (DR1) indicating the zooming operation of switching the focal length in the zooming region, as well as an enable signal (ENB), or indicating the inhibition of the zooming operation; a mode control unit 119 for receiving the signal (STU) and outputting a driving signal (DR2) for indicating the mode changing operation of changing the setting region and also outputting the signal (INH); a brake controller 120 (hereinafter simply referred as "BCT") for outputting a brake signal (BK) upon receiving both of the signal (ENB) and the signal (BU) simultaneously and inhibiting the output of the signal (BK) upon receiving the signal (INH); and a drive control unit 121 for receiving the signal (DR1) or (DR2) to drive the zooming driving unit or receiving the signal (BK) to stop the zoom driving unit. The mode control unit 119 is constituted such that it can judge the region in which the optical system 2 is situated upon receiving the signal (MD) from the mode detection unit 109.

Only the main signals are shown for the input/output in each of the units.

The pattern diagram for the pattern unit 5 shown in FIG. 15 is the same as has been described referring to FIG. 2. The explanations for FIG. 3, FIG. 4 and FIG. 5 can be applied to the device shown in FIG. 15.

Figure 16:
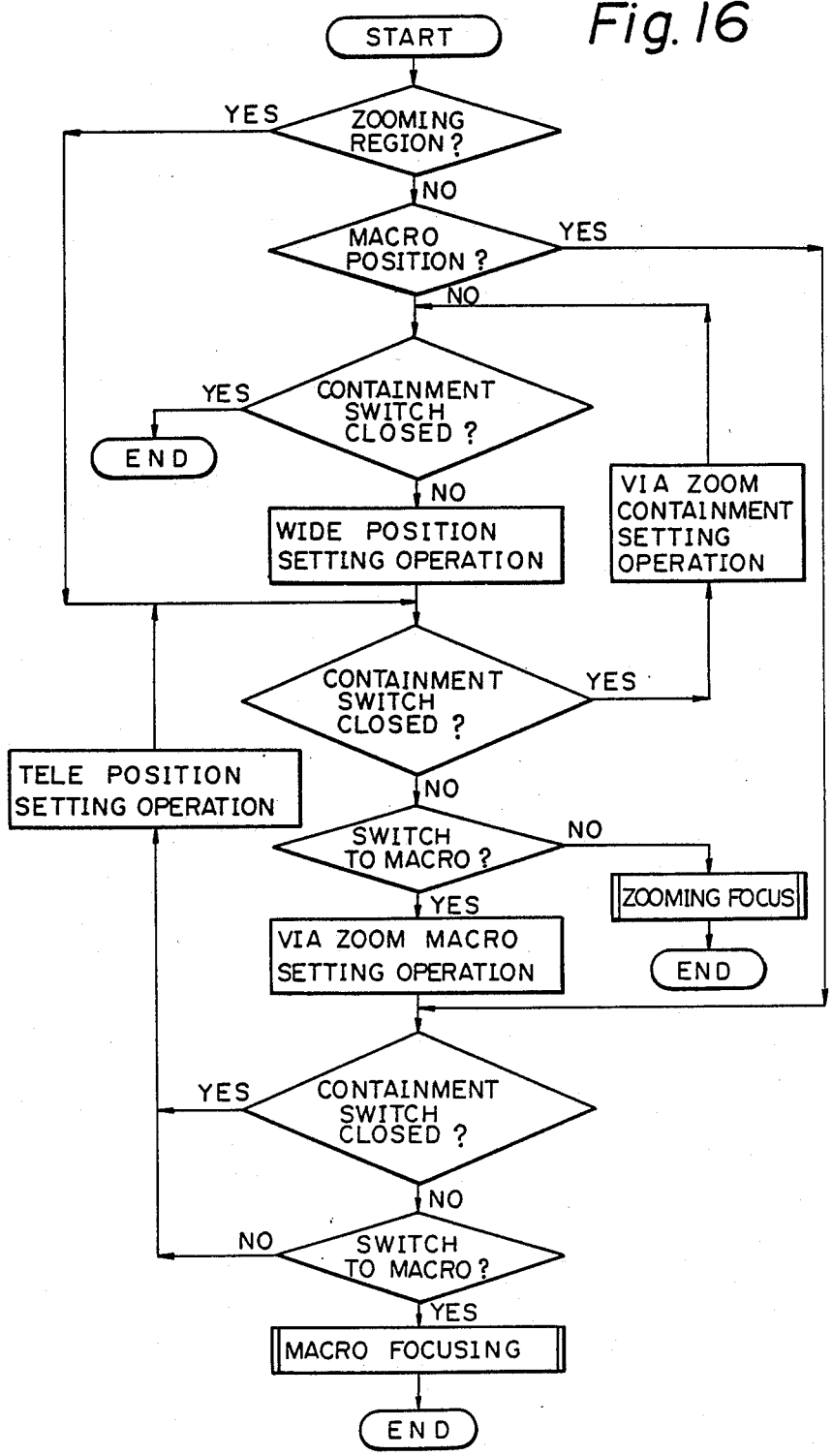
Figure 17:
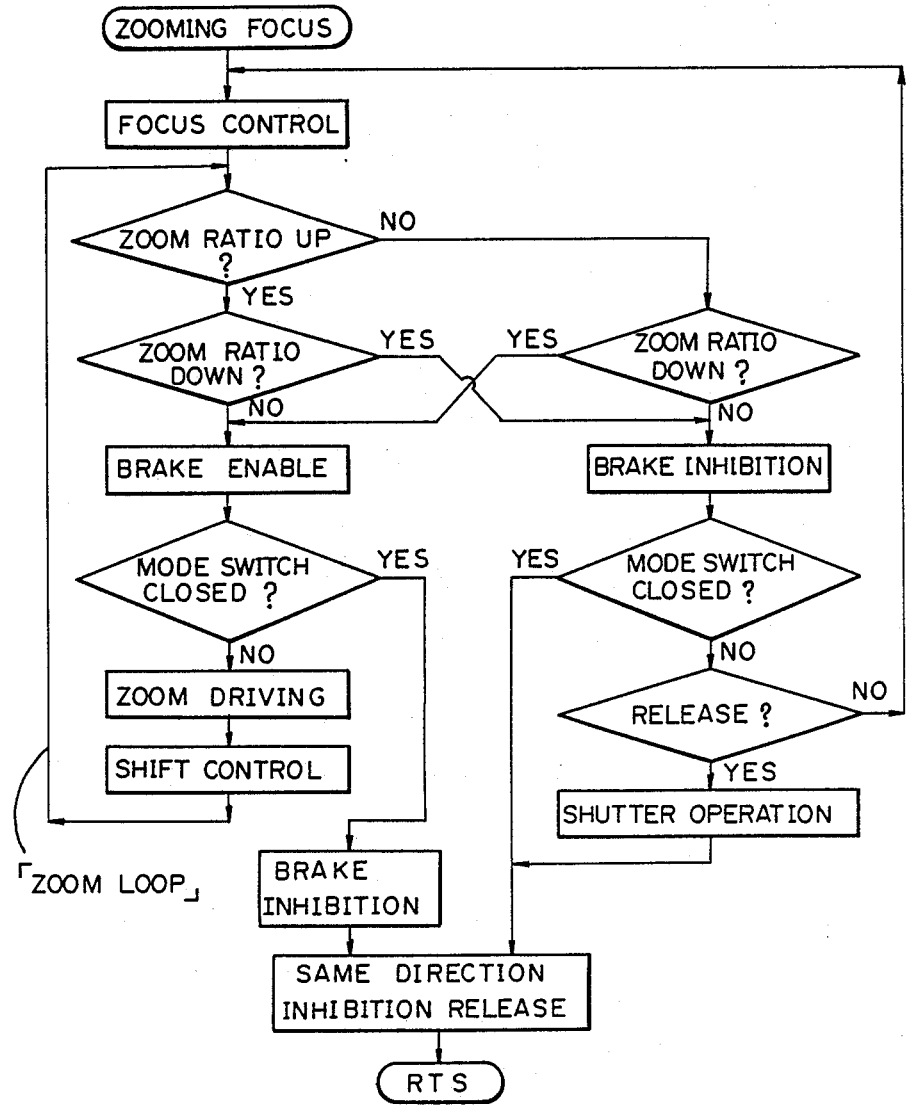

The flow chart showing the operation sequence of the device in FIG. 15 is to be explained referring to FIG. 16 and FIG. 17.

FIG. 16 is a flow chart showing the mode changing operation.

FIG. 17 is a flow chart illustrating mainly the conversion operation in the sub-routine "Zooming Focus" used in FIG. 16. Explanation for the sub-routine (ZMB) due to the interruption by which "Zooming Focus" becomes effective during operation in FIG. 17 is the same as described referring to FIG. 14. The interruption is actuated when the switch 17 is actuated and the signal (b) or the signal (c) turns to the L level. However, the interruption becomes invalid when ZMB is inhibited in FIG. 17. The mode changing operation in FIG. 16 is so constituted that it is actuated from the instance that one of the mode switch 115 is actuated (closed). The constitutions for FIG. 16 and FIG. 17 are not described here since they are explained together with the following explanation for the operation.

The operation of this embodiment having thus been constituted is to be explained referring to the flow charts shown in FIG. 16 and FIG. 17. For the sake of simplicity, explanation will be made at first while dividing the region changing operation for changing the region into the respective cases where the containment switch 15, zoom switch 16a and the MACRO switch 16b are respectively actuated (closed) and, further, dividing the case depending on the position of the brush 6 in FIG. 2 and FIG. 3 before the operation. It is assumed here that the brush 6 is always situated at a predetermined position, that is, one of the position $P_0$–$P_1$ position $P_{12}$–$P_{13}$ and an arbitrary position in the region $P_3$–$P_{10}$. Although it may be considered that the brush is stopped at a not-expected position due to external force (manual depression to the optical system 2) or troubles, etc., it can not occur in view of the design and has no direct concerns with the feature of the present invention. It is assumed that they are always at any of the predetermined positions as described above.

(i) Mode Changing Operation by Containment Switch (a) In the zooming region

The brush 6 is assumed to be at an arbitrary position in the zooming region $P_3$–$P_{10}$. If the containment switch 15 is actuated, the switch judging unit 116 judges the input from the switch 15 to actuate the region changing operation. That is, the flow chart begins from START in FIG. 16. The mode detection section 109 in the overall distinguishing unit 108 at first checks the signal (a) at the first conditional branch "Zooming Region?". As can be seen from FIG. 3, since the signal (a) is at the H level only in the region $P_3$–$P_{10}$ and the brush 6 is now in the zooming region, the flow branches into YES. The flow branches at the next conditional branch "Containment Switch Closed?" into YES while the mode control unit 119 referring to the signal (STU) indicating the operation of the switch 15 outputted from the switch judging unit 116. Then, the mode control unit 119 indicates at the next "Via Zoom Containment Setting Operation" the focus driving unit (not illustrated) to drive the lens group 3 to ∞ position. Detailed descriptions for the operation are omitted. Since the lens group 3 undergoes the driving from the focus driving unit and the zoom driving unit 4 as has been described above, this operation is conducted so as to prevent the inhibition of the mode changing operation caused by the abutment against the stopper of the focus driving unit by the driving from the zoom driving unit 4. Since the operation has no direct concerns with the present invention, details thereof are not explained here but in the section of third embodiment.

The mode control unit 119, referring to the signal (MD) showing the zooming region outputted from the mode detection unit 109, outputs the signal (DR2) for driving the brush 6 to the position $P_3$–$P_5$. The drive control unit 121 receiving this signal DR2 rotates the motor Mz to drive the optical system 2 to the WIDE position side. The mode control unit 119 outputs the signal (DR2) and the signal (INH) together, and the zoom inhibition unit 117 receiving this signal INH stops the signal (STU) from the switch judging unit 116, outputs the signal (INH) to the zoom controlling unit 118 to inhibit the actuation of the zooming operation.

The BCT 120 receiving the signal (INH) from the mode control unit 119 inhibits the output of the signal (BK) and inhibits the stop of the motor Mz at the WIDE position and the TELE position as the both boundaries (final ends) of the zooming region, which will be described later in details. That is, the BCT controls so as to continue the driving to the optical system 2. When the brush 6 reaches the WIDE position, the mode control unit 119 referring to the signal (MD) outputs the signal (MD2) to the drive control unit 121 so as to move the brush 6 from the WIDE position to the position $P_0$–$P_1$. While the signal (BU) is outputted from the boundary detection unit 119 upon the brush reaching the WIDE position. Since the BCT 120 receives the signal (INH), it does not output the signal (BK). The overall distinguishing unit 108 checks the signal (c) that changes with the brush 6 driven toward the containment position. That is, as shown in FIG. 3, the unit 108 detects that the signal (c) falls at $P_5$, turns once to the H level at $P_2$ and then again turns to the L level at $P_1$, thereby detecting the arrival of the brush 6 to the position $P_0$–$P_1$ and outputting the signal (MD) and the signal (BU) informing this arrival. The mode control unit 119 receiving the signal MD) stops the output of the signal (DR2) and the signal (INH). The BCT 120 receiving the signal (BU) outputs the signal (BK) when the signal (INH) is released and the drive control section 121 receiving this signal (BK) applies electromagnetic braking to the motor Mz to stop the optical system 2 at the containment position. "Via Zoom Containment Setting Operation" has thus been completed and the flow advances to the next conditional branch "Containment Switch Closed?", branches into YES to complete all of the operations (i) at END. In this case, by indicating the completion of setting to the containment position by means of a display (not illustrated), etc., the operator visually observes the display and stops the operation to the containment switch 15.

(b) At the MACRO position

It is assumed that the brush 6 is at the position $P_{12}$–$P_{13}$. If the switch 15 is operated, the flow begins from START in FIG. 16, branches at the second conditional branch "MACRO Position?", then branches into YES at the next conditional branch "Containment Switch Closed?" and then drives the brush 6 at the next "TELE Position Setting Operation" from the position $P_{12}$–$P_{13}$ to the position $P_8$–$P_{10}$. Although the boundary detection section 110 also outputs the signal (BU) in this case, the signal (BK) is not outputted from the BCT 120 by the signal (INH) during the operation of the mode control unit 119 as described above. The operation after the flow branching into YES at the next "Containment Switch Closed?" are the same as those in (i) (a) described above, in which the optical system 2 is driven from the TELE position to the WIDE position, further, from the WIDE position to the containment position and then set to the containment position.

(c) At the containment position

Assuming that the brush 6 is at the position $P_0$–$P_1$ and the switch 15 is actuated, the flow begins from START in FIG. 16, branches into NO at each of "Zooming Region?" and "MACRO Position?", also branches into YES at the next "Containment Switch Closed?" and completes the operation at END. That is, since they are situated at the position to be set, nothing is done.

(ii) Mode Changing Operation by the Zoom Switch (a) In the zooming region

It is assumed here that the brush 6 is at an arbitrary position in the zooming region $P_3$–$P_{10}$ and the zooming switch 16a of the Z/M changing switch 16 is actuated. The flow begins from START in FIG. 16, branches into YES at "Zooming Region?", branches into NO at the next "Containment Switch Closed?" and then branches into NO at "Switch to MACRO?" since the zooming switch 16a, not the MACRO switch 16b, is operated now. Then, it executes the predetermined operations (detailed later) at the next sub-routine "Zooming Focus" and operations (ii) are completed at END. That is, since they are already at the position to be set, nothing is done for the mode changing operation.

(b) At the MACRO position

Assuming that the brush 6 is at the MACRO position $P_{12}$–$P_{13}$ and the zooming switch 16a is actuated, the flow branches into YES at the second ""MACRO Position?" at the second step from START in FIG. 16, branches into NO at each of the "Containment Switch closed?" and "Switch to MACRO". Then, it drives the optical system 2 from the MACRO position to the TELE position to set to the zooming region at the next "TELE Position Setting Operation" and branches into NO at each of the succeeding "Containment Switch Closed?" and "Switch to MACRO?" to reach the subroutine "Zooming Focus".

(c) In the containment position

Assuming that the brush 6 is at position $P_0$–$P_1$ and the switch 16a is actuated, the flow branches into NO at the third step 37 Containment Switch Closed?" from START in FIG. 16, drives the optical system 2 from the containment position to the WIDE position at the next "WIDE Position Setting Operation". That is, it sets to the zooming region, branches into NO at each of the succeeding "Containment Switch Closed?" and "switch to MACRO?" to reach the subroutine "Zooming Focus".

(iii) Mode Changing Operation by MACRO Switch

This is the operation by the MACRO switch 16b. Since the operations are similar to those described above, explanations are omitted here. Of course the flows branches into YES at each of "Switch to MACRO?". The content for "MACRO Focusing" comprises focusing operation, shutter operation, etc. for MACRO photographing but detailed explanations are omitted.

Then, explanation is to be made for the operation in a case where the brush 6 is set to the region $P_3$–$P_{10}$ by the mode changing operation (ii) described above, that is, the portion regarding the zooming operation among the content for the sub-routine "Zooming Focus" shown in FIG. 16 along with the flow chart shown in FIG. 17. It is assumed here that the brush 6 is near the position $P_5$ and the up-switch 17a in the switch 17 is actuated. The mode control unit 119 judges that it is not the operation of the mode switch 115 while referring to the signal (STU) and stops the output of the signal (INH), by which the zoom inhibition unit 117 outputs the state signal (STU) showing the operation of the upswitch 17a to the zoom controlling unit 118. The flow shown in FIG. 17 is thus started.

At first, at "Focus Control" the focus driving unit (not shown) drives the lens group 3 to conduct focusing operation, etc. due to the data from the distance measuring unit (also not illustrated). At the next conditional branch "Zoom Ratio up?", the zoom control unit 118 checks the signal (STU) obtained by way of the zoom inhibition unit 117 and since the up-switch 17a has been operated in this case, branches into YES. Then, the flow naturally branches into NO at the next conditional branch "Zoom Ratio Down?", and the zoom controlling unit 118 outputs the signal ENB at the next "Brake Enable". Then, the BCT 120 receiving the output ENB is in such a state as capable of outputting the signal (BK) at the instance of receiving the signal (BU) since the signal (INH) has already been released as described above. Now, at the next conditional branch "Mode Switch Closed?", the flow branches into NO after confirming that none of the switches of the switch 115 is operated and, at the next "Zoom Driving", the zoom controlling unit 118 outputs the signal (DR1) showing the driving in the zoom ratio up-direction and the drive control unit 121 receiving this output DR1 starts driving the brush 6 at the position $P_5$ toward the TELE position. That is, the zooming operation is started. The next "Shift Control" is operation for compensating the deviation in the imaging position (shift) resulted along with the zooming operation. The focal length detection unit 107 receiving the information (Zp) that changes depending on the movement (increasing in this case) of the optical system 2 and the brush 6 executes the calculation of the shift compensation to the information Zp. The focus driving unit not illustrated receiving this result drives the lens group 3 to compensate the shift. Then, the flow again returns to the conditional branch "Zoom Ratio Up?" and then subsequently repeats the identical operations. The operation loop is referred to as the zoom loop. When the brush 6 is driven and reaches from $P_5$ by way of $P_6$ and $P_7$ to $P_8$, the signal (b) falls and the signal (BU) is outputted from the boundary detection unit 110 and, at this instance, the sub-routine "ZMB" due to interrupt shown in FIG. 14 is actuated. That is, the BCT 120 receiving the signal (BU) at first outputs the signal (BK) at the first "Zoom Motor Brake" and the driving control unit 121 receiving this signal BK applies electromagnetic brake to the zoom motor Mz after disconnecting the driving signal (DR1) at the inside. Then, the BCT 120 continuously branches for a predetermined of time into NO at the next conditional branch "Brake End?" to continue the braking operation and then branches into YES. At the next conditional branch "Zooming Region?", the BCT 120 receiving the boundary signal (BU) checks as to if the brush 6 is situated within the zoom region (TELE position) or not, that is, judges as to if the over-run has occurred and the brush 6 has intruded into the MACRO region exceeding the end $P_{10}$ of the TELE position at the boundary of the zoom region or not. In this case, the flow branches into YES judging that the over-run did not occur and, at the next conditional branch "Signal (c) at L Level?", since the brush 6 now stops within the position $P_8$-$P_{10}$, the flow checks the level of the signal (c) and branches into NO. Then, at the next conditional branch "Signal (b) at L Level?", it branches into YES upon checking the level for the signal (b) and inhibits the driving in the same direction (MACRO position direction) as the driving direction just before applying brake at the next "MACRO Direction Inhibition". Then, the flow returns at RTI to the zoom loop in FIG. 17. Accordingly, even if the up-switch 17a is actuated again in this state, the driving to the zoom ratio up direction, that is, to the MACRO position direction is inhibited by the BCT 120. Accordingly, the system does not escape from the TELE position to the MACRO region.

Explanation is to be made for the case where the flow branches into NO at the conditional branch "Zoom Region?" in FIG. 14. That is the case where over-run is generated. Accordingly, the brush 6 is situated slightly within the MACRO region exceeding the end $P_{10}$ at the TELE position. At first, the flow checks the containment region signal (c) at the conditional branch "Signal (c) at L Level?" and, since the signal is at the H level, it branches into NO. Then, the zoom controlling unit 118 outputs again the signal (DR1) indicating the backward rotation at "Driving to Containment Direction" and the drive control unit 121 receiving this signal causes the zoom motor Mz to rotate backwardly. Then, while repeating the checking operation of branching into NO at the next "Zooming Region?", the brush 6 passes over $P_{10}$ and upon reaching the TELE position $P_8$-$P_{10}$ as the boundary, the flow branches into YES at the checking operation "Zooming Region?", again returns to the initial braking operation. The subsequent operations are the same as have been described above.

Then, in this state, i.e., in a case where the brush 6 is within the TELE position $P_8$-$P_{10}$ and the down switch 17b is actuated, the flow executes the "Focus Control" in FIG. 17, then branches into NO at the next "Zoom Ratio Up?", branches at the next conditional branch "Zoom Ratio Down?" into YES, the zoom controlling unit 118 outputs the signal (ENB) described above at "Brake Enable" to enter into the zoom loop operation. That is, the optical system 2 is driven from the TELE position to the WIDE position and the driving is also continued till the operation (closing) of the down switch 17b is kept continued. When the brush 6 reaches within the wide position $P_3$-$P_5$ as another boundary, the sub-routine ZMB due to interrupting shown in FIG. 14 is actuated as has been described above to execute the same operations as those explained above, to stop the brush 6 within the position $P_3$-$P_5$ and inhibit the re-driving toward the containment position by "Containment Direction Inhibition". Both of this inhibition state and the inhibition state in the MACRO direction are released upon operation of the containment switch 15 or the Z/M change switch 16, that is, upon operation of the switch 115.

Now, in the case where none of the zoom ratio change switches 17 is actuated, or where both of the up/down switches 17a and 17b are actuated, the flow branches at the first conditional branch "Zoom Ratio Up?" in FIG. 17 and branches into NO at the next "Zoom Ratio Down?" to reach "Brake Inhibition". Alternatively, it branches into YES at the first "Zoom Ratio Up?", then branches into YES at the next "Zoom Ratio Down?" to reach the also to reach "Brake Inhibition". That is, in either of the cases, the zoom controlling unit 118 regarding that the switch 17 is not actuated and cancels the signal (ENB) at "Brake Inhibition" to inhibit the interrupt to the sub-routine "ZMB" in FIG. 14. Accordingly, the BCT 120 is put under such a state that can not output the signal (BK) even upon receiving the signal (BU). In other words, it can be said a state able to perform a mode alteration operation is prepared. Then the flow branches into NO at the next "Mode Switch Closed?" if the switch 115 is not actuated, checks the state of the release switch (not illustrated) at the next conditional branch "Release?". If the release switch is not actuated, the flow again returns to the "Focus Control" again. In a case where the release switch is actuated, the shutter is driven at the next "Shutter Operation" to conduct photographing and the flow releases the inhibitions for both "Containment Direction Inhibition" and "MACRO Direction Inhibition" in FIG. 14 described above at the next "Same Direction Inhibition Release", that is, prepares for enabling the mode changing operation. Then, the flow returns at RTS to the operation END next to "Zoom Focus" in FIG. 16 to complete all of the changing operations. In case where the flow branches into YES, at the "Mode Switch Closed?" after "Brake Inhibition", the flows returns to the END in FIG. 16 after executing the next "Release Same Direction Inhibition". Alternatively, in a case where the flows branches into YES at "Mode Switch Closed?" in the zooming loop, it returns to END in FIG. 16 after executing the next "Brake Inhibition" and releasing the same direction inhibition described above. That is, it is prepared to enable the mode changing operation at the instance upon completing the operation in FIG. 17. Further, when the flow branches into YES at either of the two "Mode Switch Closed?", the mode changing operation is FIG. 16 is of course actuated succeeding to the operation in FIG. 17.

As has been described above according to this embodiment, when the zooming operation is actuated, the mode control unit 119 interrupts the output of the signal (INH), by which the zoom controlling unit 118 outputs the signal (ENB) and the BCT 120 can interrupt the operation of the drive control unit 121 by means of the signal (BK), so that the movement of the optical system 2 by the zooming operation within the zooming region can surely be stopped at the TELE position or the WIDE position as the boundary of the zooming region based on each of the region signals (a), (b) and (c) outputted from the distinguishing pattern unit 5. Accordingly, there can be obtained a merit that an electrical stopper can be constituted with ease due to the interruption for the output of the signal (INH) and the output of the signal (ENB) without increasing the size as in the conventional mechanical stopper.

Since it is so adapted that the mode control unit 119 outputs the signal (INH) to inhibits the zooming operation when the mode changing operation i actuated, and the output signal (BK) from the BCT 120 is inhibited even when the optical system 2 reaches the boundary (TELE position or WIDE position), the optical system 2 can smoothly pass on the boundary with no troubles while the optical system 2 can surely be stopped at the boundary in the zooming operation as has been described above. The optical system 2 can be stopped at any of the predetermined positions to be set without requiring particular releasing mechanism for the stopper in the mode changing operation.

Since no movable parts corresponding to the mechanical stopper and the releasing mechanisms are required at all, the structure is simple to eliminate the mechanical rattlings free from the effect of aging changes and extremely advantageous in view of the cost, as well as shows stable operation.

Since the operation corresponding to the operation of the releasing mechanism can be conducted automatically, it can provide a merit of high operationability.

Furthermore, since the boundary region corresponds to the balance region, it can provide a merit that the focal length does not change even if the optical system stops at any of the positions in the boundary region.

The present invention is not restricted only to the embodiments described above and various modifications are possible within a range not departing the gist thereof.

A mechanical stopper may be disposed in combination at the position $P_0$ and $P_{13}$ which are the ends for the position $P_0$–$P_1$ and the position $P_{12}$–$P_{13}$.

The resistors 13 may be omitted in a case where they have been already disposed in the overall distinguishing unit 108 respectively.

It is not always necessary that the region $P_0$–$P_3$ and the region $P_{10}$–$P_{13}$ are in adjacent with the position $P_3$ $P_5$ and $P_8$–$P_{10}$ in the zooming region respectively, but they may be in adjacent with the opposite sides respectively. In short, it is only necessary that the containment region is in adjacent with the side where the moving amount of the optical system 2 for containment is smaller.

The sub-routine "ZMB" in FIG. 14 is not restricted to the interruption but a sub-routine by a usual software is also usable.

The switch 115 and the switch 17 are not restricted to mechanical momentary switch but they may be a so-called touch-switch using electrostatic or magnetic devices.

Figure 18:
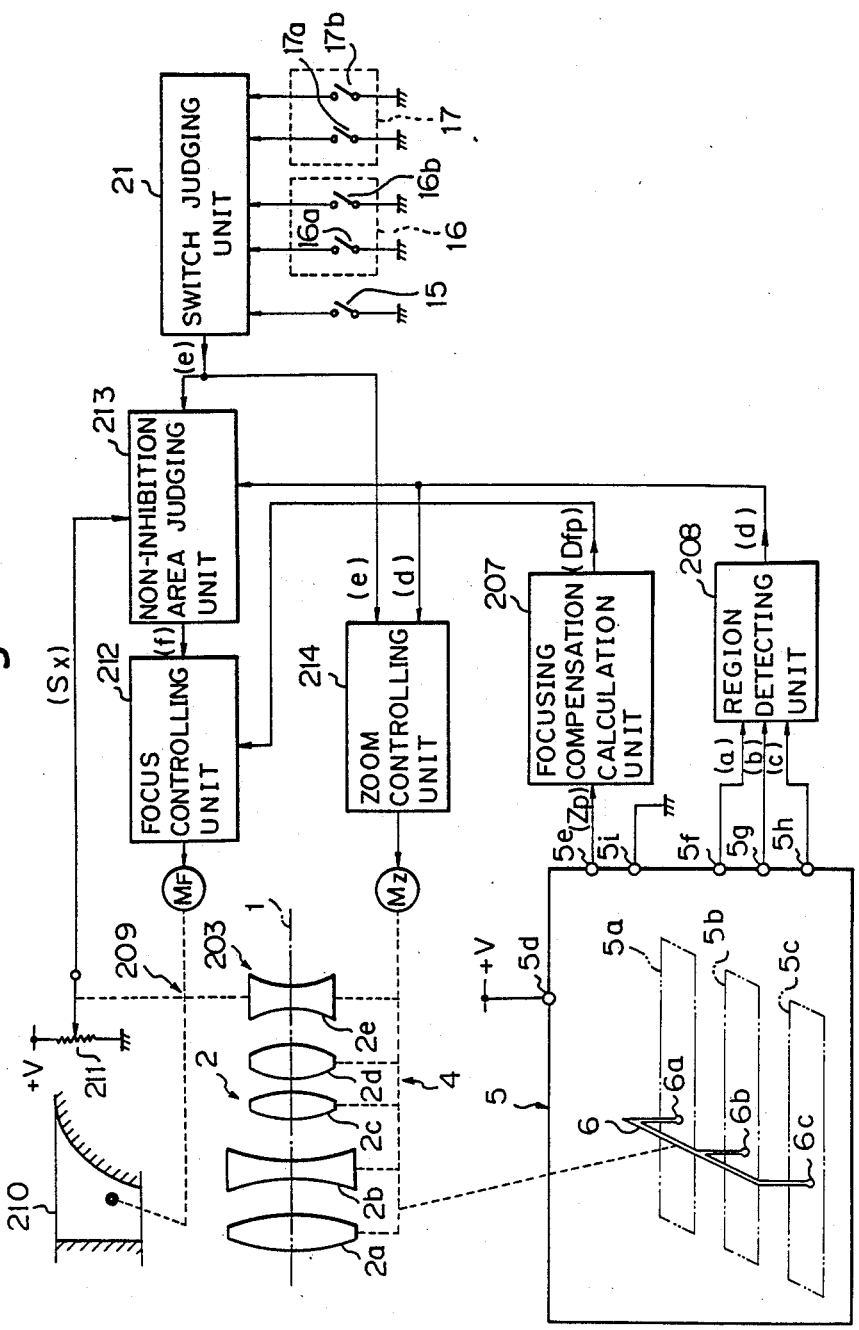
FIG. 18 is a block diagram illustrating the entire constitution of the zooming optical system control device as the third embodiment according to the present invention.

FIG. 18 is a block diagram illustrating the entire constitution of a zooming optical system control device according to the fifth and sixth inventions.

In FIG. 18, identical portions with those in FIG. 1 carry the same reference numerals and the explanations therefor are the same as those in FIG. 1. In FIG. 18, a focusing lens group 203 is constituted with a lens group 2a.

In the figure, there are shown focusing compensation calculation unit 207 for receiving the information (Zp), applying A/D conversion by an internal A/D converter, then conducting the calculation for the shift compensation and outputting the result as the compensation amount (Dfp); a region detecting unit 208 for receiving the signals (a), (b) and (c) to detect the region in which the brush 6 is situated and outputting a signal (d) showing a detected region; a focus driving unit 209 comprising a focus motor $M_F$ and a mechanical section not illustrated for driving the focusing lens group 203 and a focusing lens group position detector 211 described later to an optional position in a movable area from the infinite position ($\infty$ position) to the nearest position on an optical axis 1 corresponding to the object distance from the infinite to the nearest distance; independent of the driving by a driving unit 4, a focus stopper 210 to be detailed later for stopping the movement of the focusing lens group 203 driven by the focus driving unit 209 at the $\infty$ position and the nearest position as described above; the focusing lens group position detector 211 described above (hereinafter simply referred to as "FPM") for outputting the position of the focusing lens group 203 on the optical axis 1 as a focusing position information (Sx) by means of voltage; a focus controlling unit 212 for controlling the focus driving unit 209 upon receiving the compensation amount (Dfp); a non-inhibition area judging unit 213 for receiving the information (Sx) and applying A/D conversion thereto, judging the non-inhibition area in which the movement of the optical system 2 is not inhibited by previously stored data of a non-inhibition areas DS, a safety range $M_F$ and an inhibition area SH upon receiving the signal (d) and a state signal (e) described later and outputting an execution signal (f) to the focus controlling unit 212; a zoom controlling unit 214 for controlling the driving unit 4 upon receiving the signal (d) and the signal (e); a switch judging unit 221 to which each of the switches 15, 16a, 16b, 17a, 17b is connected and which judges the state thereof to output the state as the signal (e) described above. The input terminal for the signals (a), (b) and (c) of the region detection unit 208 are all pulled-up at the inside. Only the main signals are shown for the input/output to each of the units.

The pattern diagram for the pattern unit 5 in FIG. 18 is the same as described in FIG. 2. Accordingly, explanations for FIG. 3, FIG. 4 and FIG. 5 can be applied to the device shown in FIG. 18.

Figure 19:
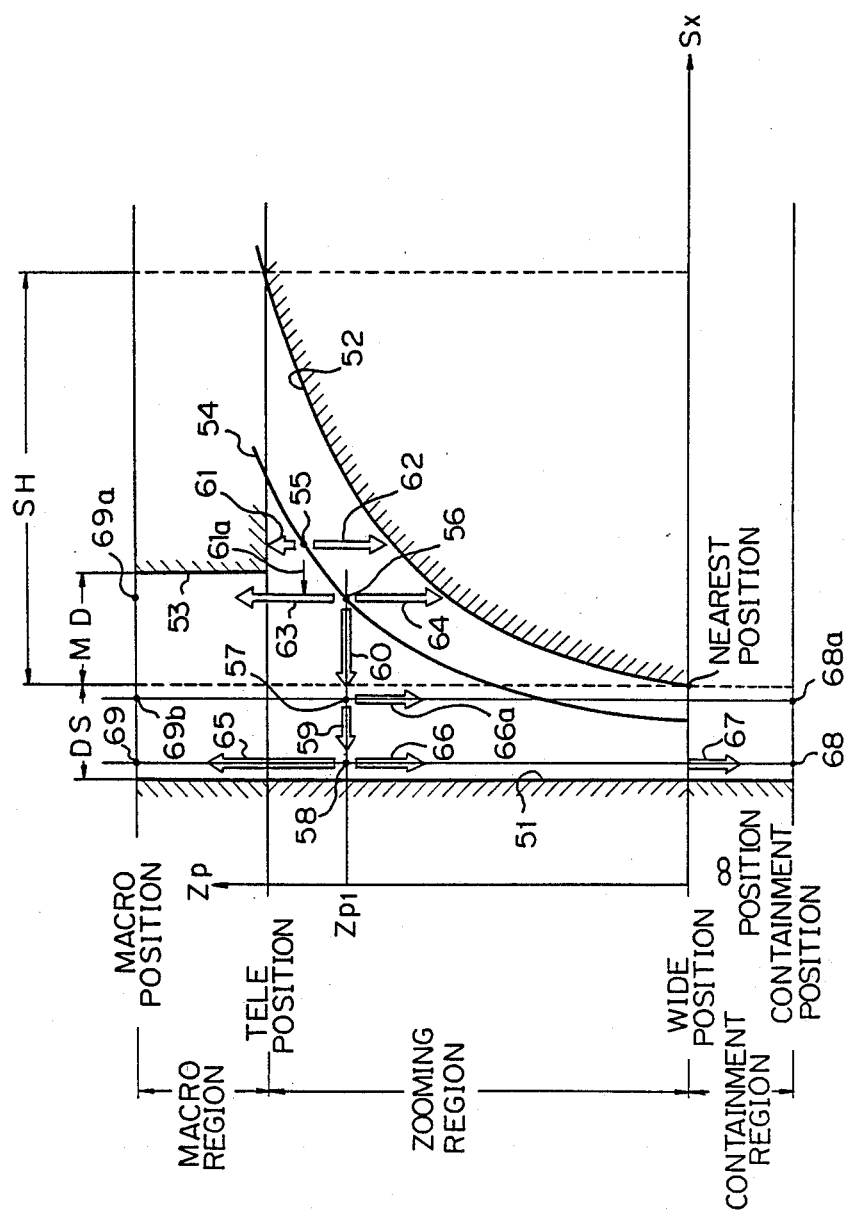
FIG. 19 illustrates the characteristics of the focus stopper shown in FIG. 18 and illustrates the operation of the device shown in FIG. 18.

Characteristics of the focus stopper 210 shown in FIG. 18 and operations for each of the units in FIG. 18 are explained referring to FIG. 19.

FIG. 19 is a graph showing the characteristics of the zooming region while indicating Zp on the ordinate and Sx on the abscissa, in combination with the graph showing the characteristics of the MACRO region and the containment region attached on the TELE position side and the WIDE position side of the graph respectively.

In FIG. 19, a $\infty$ position stopper 51 is disposed on the $\infty$ position side of the focus stopper 210 as an invariable stopping portion and a nearest position stopper 52 is adapted to vary depending on the change of the focal length f or the information (Zp). In FIG. 19, are also shown the non-inhibition area DS; the safety range MD in the MACRO region; the inhibition area SH; a nearest stopper 53 on the nearest side in the MACRO region; an optional focusing curve 54; points 55 and 56 both on the focusing curve 54; points 57 and 58 on Zp=Zpl together with the point 56; arrows 59, 60 and 61a showing the moving direction of the focusing lens group 3; arrows 61–67, 66a showing the moving direction of the optical system 2 including the focusing lens group 3; points 68 and 68a on the containment position; and points 69, 69a, and 69b on the MACRO position.

Figure 20:
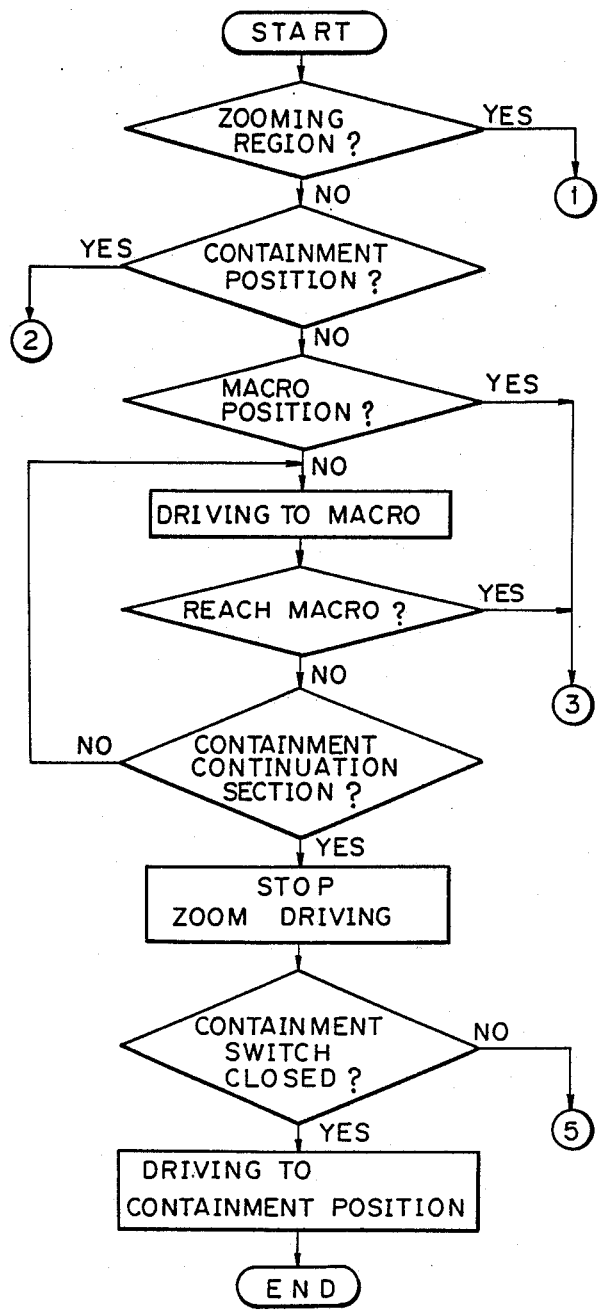
Figure 22:
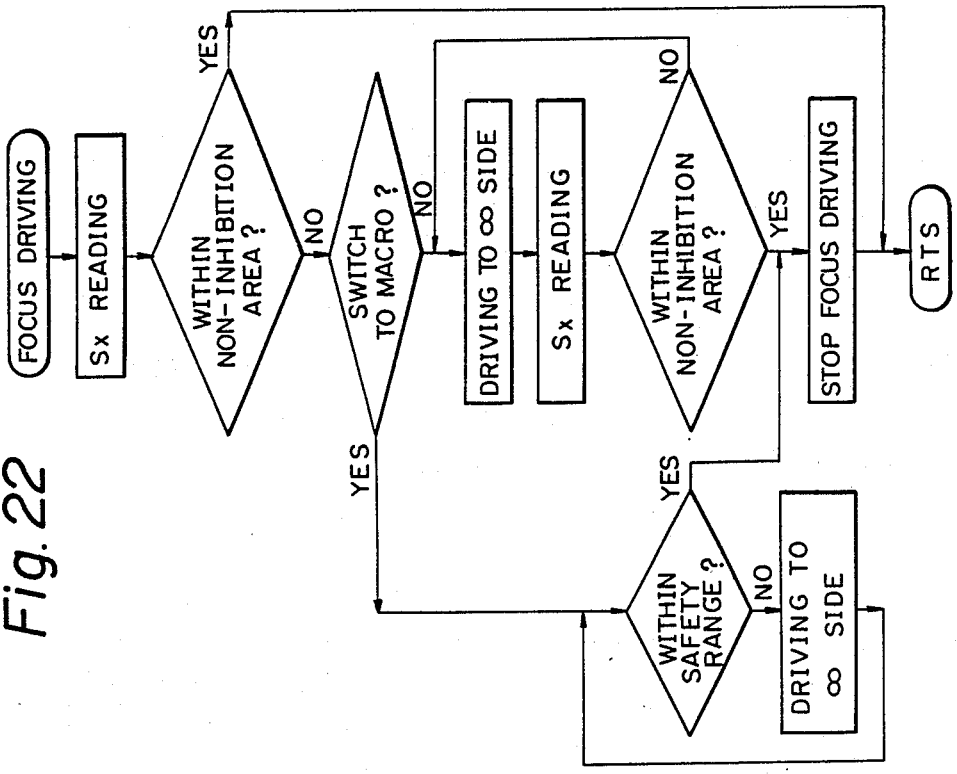
Figure 21:
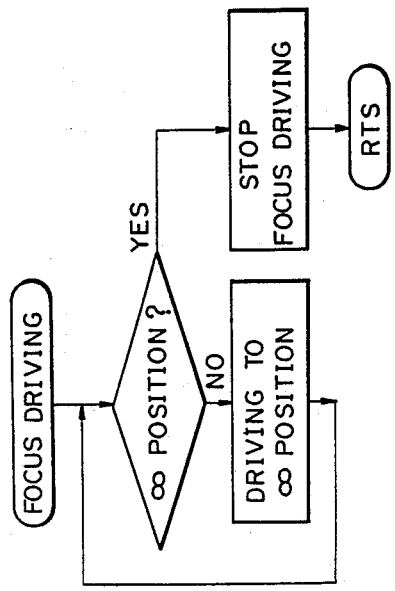

FIG. 20 through FIG. 22, as well as FIG. 7 are flow charts illustrating the operation sequence of the device shown in FIG. 18, in which FIG. 20 and FIG. 7 are main routine, FIG. 21 and FIG. 22 are sub-routines "Focus Driving" used in the main routine in FIG. 7. FIG. 21 shows the operation of the focus driving according to the fifth invention, while FIG. 22 shows the operation of the focus driving according to the sixth invention. Since the constitution of the flow charts are to be described together with the following explanation for the operation, their explanations are omitted here.

Description is at first made as to the operation of the embodiment having thus been constituted for the operation according to the fifth invention along with the main routine in FIG. 20 and FIG. 7 and the sub-routine in FIG. 21.

(i) Region Changing Operation to the Containment Region (a) In the zooming region It is assumed that the optical system 2 including the focusing lens group 203 is at the point 56 on the focusing curve 54 in FIG. 19. Corresponding to FIG. 3, it is assumed that the optical system 2 is at the position corresponding to $Z_p=Z_{p1}$ in the focal length variable section $P_5$-$P_8$ in the zooming region. If the switch 15 is actuated (closed), the flow begins from START in FIG. 20. The region detection unit 208 checks the signal level of the signal (a) at the first conditional branch "Zoom Region?". In this case, since the signal (a) is at the H level, and it can be found that the brush 6 is within the zooming region $P_3$-$P_{10}$, the flow branches into YES and transfers from (1) in FIG. 20 to (1) in FIG. 7. Then, the flow branches into YES at the next conditional branch "Containment Switch Closed?" to reach the next sub-routine "Focus Driving". The content of the sub-routine is shown in FIG. 21 as described above. The non-inhibition area judging unit 213 reads the output Sx from the FPM 211 at the first conditional branch "∞ Position?", applies A/D conversion and then checks if the lens group 203 situates near the stopper 51 or not in FIG. 19.

In this case, since the lens group 203 is on the focusing curve 54, the flow branches into NO and then the non-inhibition area judging unit 213 confirms at the next "Driving to ∞ Position", the signal (e) from the switch judging unit 221 indicating that the switch 15 is turned ON and then outputs the signal (f). The focus controlling unit 212 receiving this signal (f) drives the lens group 203 toward the arrow 60 by way of the focus driving unit 209. Then, it drives passing over the point 57, further, toward the direction of the arrow 59 and further drives the focusing lens group 203 to the point 58 near the stopper 51. Then, the flow again returns to "∞ Position?", branches into YES, stops the focusing motor $M_F$ at the next "Stop Focusing Drive", returns at RTS to the main routine in FIG. 7 and transfers from "Focus Drive" to the next operation. Then, at the next "Driving to WIDE Position", it determines the direction to be driven while referring to the signal (d) and the signal (e) and drives the optical system 2 to the WIDE position. That is, it drives toward the arrow 66. When the signal (c) falls at $P_5$, the region detecting unit 208 detects this and outputs the signal (d) indicating that the brush 6 is situated at the WIDE position $P_3$-$P_5$. The zoom controlling unit 214 receiving this output (d) advances to the next "Driving to Containment Position" and further drives the brush 6 from the WIDE position to the position $P_0$-$P_1$. That is, it drives toward the arrow 67 and completes the driving at the point 68 as the containment position in FIG. 19. Then, the flow branches into YES at the next conditional branch "Containment Switch Closed?" and completes the region changing operation to the containment region at END.

(b) In the MACRO region

In a case where brush 6 is situated at the MACRO position $P_{12}$-$P_{13}$ in the MACRO region, explanations are to be made in the case where the optical system 2 is on the point 69a in FIG. 19, but other conditions are the same as in (i) (a). When the switch 15 is closed, the flow branches into YES at the third step, that is, the conditional branch "MACRO Position?" and transfers from (3) in FIG. 20. The flow goes to (3) in FIG. 7, branches into YES at "Containment Switch Closed?", executes the sub-routine in FIG. 21 at the next sub-routine "Focus Driving" to drive the lens group 3 near the stopper 51 (point 69). Then, the brush 6 at the MACRO position is moved to the TELE position $P_8$-$P_{10}$ at the next "Driving to the TELE Position". Then, the flow branches into YES at the next "Containment Switch Closed?" and executes the via zoom containment setting operation and the subsequent operations are as described above. (c) In the containment region In a case where the brush 6 is situated at the position $P_0$-$P_1$ in the containment region, if the optical system 2 is on the point 68, for instance, in FIG. 19, the flow branches into YES at the second step, that is, the conditional branch "Containment Position?" in FIG. 20, transfers to FIG. 7, branches into YES at "Containment Switch Closed?" and completes the operation at END. That is, since the optical system 2 has already been situated at the containment position, the region changing operation to the containment region is not conducted.

(ii) Region Changing Operation to MACRO Region (a) In the zooming region

In a case where the optical system 2 is at the point 56 in FIG. 19 and the switch 16b of the switch 16 is actuated (closed), the flow branches into YES at the first conditional branch "Zoom Region?" in FIG. 20 in the same manner as in (ii) (a) described above, transfers to (i) in FIG. 7, branches into NO at the next "Containment Switch Closed?", and branches into YES at the next "Switch to MACRO?" and reaches "Focus Driving". Then, the focusing lens group 203 is driven from the point 56 to the direction of the arrow 60 and 59 to the point 58 by the sub-routine shown in FIG. 21 in the same manner as described above. The optical system 2 is driven to the direction to the arrow 65 at the next "Driving to TELE Position" and the next "Driving to MACRO Position" and reaches the point 69 as the MACRO position. Then, the flow branches into NO at the next "Containment Switch Closed?", branches into YES at the next "Switch to MACRO?", executes the predetermined operation at the next "MACRO Focus" (explanation is omitted) and reaches END thereby completing the region changing operation to the MACRO region.

(b). In the MACRO region

In a case where the optical system 2 is at a MACRO position in the MACRO region, since it has already been at the position to be changed as described above, nothing is done.

(c) At the containment position

When the switch 16b is actuated in a case where the brush 6 is situated at the position $P_0$-$P_1$ in the containment region (point 68 in FIG. 19), the flow branches into YES at "Containment Position?", transfers to (2) in FIG. 7, branches into NO at "Containment Switch Closed?" and reaches "Focus Driving". The flow executes the sub-routine in FIG. 21 in the same manner as described above, and drives the focusing lens group 203 to the vicinity of the =position stopper 51. Then, it drives the optical system 2 to the WIDE position at the next "Driving to WIDE Position" and the subsequent operations are the same as those in (ii) (a).

(iii) Region Changing Operation to Zoom Region

Since the operation are similar to (i) and (ii) described above, the explanation, are omitted.

Next, the operation according to the sixth invention is to be explained referring to the main routines in FIG. 20 and FIG. 7 and the sub-routine shown in FIG. 22 while dividing the cases in the same manner as above and emphasizing the difference with the operations described above.

(i) Region Changing Operation to Containment Region (a) In the zooming region

It is assumed that the optical system 2 is on the point 56 in FIG. 19, that is, in the zooming region. It is assumed here that the containment switch 15 is actuated to close. The flow begins from START in FIG. 20, branches into YES at "Zooming Region?", transfers to (1) in FIG. 7, branches into YES at the next "Containment Switch Closed?" and reaches the sub-routine "Focus Driving". Then, the flow transfers to FIG. 22. The non-inhibition area judging unit 213 at first reads the position of the focusing lens group 203 on the optical axis at the point 56, that is, the information Sx as the output from the FPM 11 at the first "Sx Reading", applies A/D conversion and refers to the data non-inhibition area DS previously stored at the next conditional branch "Within the Non-inhibition Area?" and the flow branches into NO since it is out of the non-inhibition area DS, that is, in the inhibition area SH in this case. Then, the flow branches into NO at the next conditional branch "Switch to MACRO?", starts driving the focusing lens group 203 toward the arrow 60 at the next "Drive to ∞ Side", starts movement at the next "Sx Reading" and checks at the next "Within Non-inhibition Area?" as to if the focusing lens group 203 enters into the non-inhibition area DS or not while monitoring the output Sx from the FPM11 that starts to change and branches into NO if it is not in the area DS. Then, the flow branches into YES upon the lens group 203 reaching the point 57, stops the focus motor $M_F$ at the next "Stop Focus Driving" and then returns at RTS to the main routine in FIG. 7. Then, after "Driving to WIDE Position", the operations are the same as those in (i) described above, in which the optical system 2 is driven toward the arrow 66a to the point 68a as the containment position in the containment region to complete the region changing operation to the containment region.

(b) In the MACRO region

In a case where the optical system 2 is at the MACRO position (point 66a) in the MACRO region, the operations are the same as those in (i) (b) described above except for that the content for each of the sub-routines "Focus Driving" in FIG. 7 is that in FIG. 22, that is, the focusing lens group 203 is not driven to the vicinity of the ∞ position stopper 51 but the driving is stopped upon entering the inside of the non-inhibition area DS (point 69b).

(c) In the containment position.

Since the optical system has already been at the containment position to be changed in the same manner as in (i) (c), nothing is done.

(ii) Region Changing Operation to MACRO Region (a) In the zooming region

If the switch 16b is actuated in a case where the optical system 2 is at the point 56, the operations from START in FIG. 20 to the via-zoom MACRO setting operation in FIG. 7 are the same as those in (ii) (a) described above. The flow transfers at "Focus Driving" in the operation in FIG. 22, executes "Sx Reading", branches into NO at "Non-inhibition Area?" and then branches into YES at the next "Switch to MACRO?". Then, the non-inhibition area judging unit 213 checks at the next conditional branch "Within Safety Range?" as to if the focusing lens group 203 is situated or not within the previously stored data safety range MD. In this case, the flow branches into YES, and returns by way of "Stop Focus Driving" (nothing is done to the operation in this case) at RTS to the main routine in FIG. 7. Then, the flow executes the operations after "Driving to TELE Position" in the same manner as described above, drives the optical system 2 toward the arrow 63 and finally sets it at the point 69a that is the MACRO position in the MACRO region to complete the operation.

Further, if the MACRO switch 16b is actuated in a case where the optical system 2 is at the point 55 in FIG. 19, the flow branches into NO at "Within Safety Range'" in FIG. 22, starts to drive the focusing lens group 203 toward the direction of the arrow 61a at "Driving to ∞ Side", returns again to "Within Safety Range?", branched into YES upon the optical system 2 crossing the arrow 63, stops the focus motor $M_F$ at the next "Stop Focus Driving" and returns to FIG. 7. In the subsequent operations, the optical system 2 is driven toward the arrow 63 and set at the point 69a in the same manner as described above.

(c) In the containment region

Since the optical system 2 is within the non-inhibition area DS when it situates either at the point 68 or at the point 68a, the flow branches into YES at the first conditional branch "Within Non-inhibition Area?" in FIG. 22, that is, nothing is done in the sub-routine "Focus Driving". As can be seen from FIG. 19, if it is driven just upwardly, it reaches the point 69 or 69b as the MACRO position.

(iii) Region Changing Operation to Zooming Region

Since the operations are similar to those in the foregoing explanations, no further details are explained here. Since the operations after branching into NO at "MACRO Position?" in the flow chart in FIG. 20 have no direct concerns with the present invention, explanations therefore are omitted.

In a case where the switch 17 is actuated in the zooming region, the zoom controlling unit 214 receiving the signal (e) starts the zoom ratio changing operation. Since "out of focus" condition is generated by the zooming operation of the optical system 2 in the case of a vari-focal lens, the focus controlling unit 212 receives the compensation amount Dfp for compensating the deviation from the focusing compensation calculation unit 207 to conduct the compensation operation along with the focusing curve 54. However, since it has no direct concerns with the feature of the present invention, explanations therefor are omitted.

As has been described above according to this embodiment, since the focusing lens group 203 is driven to the vicinity of the ∞ position stopper 51 where the movement thereof is not inhibited by the stopper 52 or the nearest stopper 53, prior to the execution of the region changing operation for changing the setting region of the zooming optical system as the operation according to the fifth invention, the movement of the optical system 2 including the focusing lens group 203 is not inhibited by the stopper 52 or the stopper 53, and the region changing operation can be conducted automatically to improve the operationability.

As the operation according to the sixth invention, when executing the region changing operation from the zooming region to the MACRO region by driving the focusing lens group 203 into the non-inhibition area DS, particularly, where the stopper 53 in the MACRO region and the stopper 52 are in a positional relationship as shown in FIG. 19, if the focusing lens group 203 is within the safety range MD, since the optical system 2 can be driven instantly to the MACRO region without driving the focusing lens group 203 to the non-inhibition area DS, prior to the execution of the region changing operation, not only the operationability can be improved as described above but also the driving time can be shortened.

The present invention is not restricted to the foregoing embodiments but various modifications can be possible within the range not departing the scope thereof.

For instance, the MACRO region and the containment region are respectively modified upon practice.

For example, it is not always necessary that the MACRO region and the containment region are in adjacent with the TELE position side and the WIDE position side of the zooming region and they may be in adjacent with the opposite direction.

The focusing lens group 203 is not restricted to the lens group 2e, but it may be a lens group 2a or the combination of the lens group 2a with the lens group 2b. In short, it can optionally be constituted provided that the portion of the optical system 2 is constituted as the focusing lens group 203.

The setting region is not restricted only to the three regions, that is, of the MACRO region, zooming region and containment region, but 2-region constitution may be employed while saving the MACRO region, or 4-region constitution may be used while adding an additional region. It is only necessary that the setting region comprises a plurality of regions.

In a case, where the optical system 2 comprises a zooming lens, the calculation section 207 may be omitted.

What is claimed is:

1. A zooming optical system control device for controlling the setting of a zooming optical system to one of a plurality of regions such as a zooming region wherein said optical system ensures zooming photographing, a macro region wherein said optical system ensures macro photographing and a containment region wherein said optical system is contained into a predetermined position, said optical system comprising a zooming lens group, a macro lens group and a focusing lens group each disposed on one identical optical axis, said control device comprising;
(a) a generating means for generating a distinguishing information representing said one of a plurality of regions wherein said optical system is situated and for generating a disable information representing that said optical system is situated in a non-distinguishable region in which said generating means can not distinguish a region wherein said optical system is situated in a case where said optical system is situated in said non-distinguishable region,
(b) an instructing means for instructing a setting region whereto said optical system is to be set,
(c) a driving means for driving said optical system in order to set said optical system to said setting region, and
(d) a control means for controlling said driving means in such a manner that said driving means drives said optical system to said setting region and drives said optical system toward said one of a plurality of regions when said generating means generates said disable information.

2. A zooming optical system control device for controlling the setting of a zooming optical system to one of a plurality of regions such as a zooming region wherein said optical system ensures zooming photographing, a macro region wherein said optical system ensures macro photographing and a containment region wherein said optical system is contained into a predetermined position, said optical system comprising a zooming lens group, a macro lens group and a focusing lens group each disposed on one identical optical axis, said control device comprising;
(a) a generating means for generating a distinguishing information representing said one of a plurality of regions wherein said optical system is situated, said generating means having a boundary region corresponding to a boundary between two of said plurality of regions adjacent to each other,
(b) an instructing means for instructing a setting region whereto said optical system is to be set,
(c) a driving means for driving said optical system in order to set said optical system to said setting region and having a balance region in which positions of said lens groups along said optical axis does not change in a case where said driving means operates, said balance region corresponding to said boundary region, and
(d) a control means for controlling said driving means in such a manner that said driving means stops driving said optical system when said optical system reaches to one end of said boundary region from outside of said boundary region in a case where said optical system is driven to said boundary region instructed by said instructing means, and that said driving means starts driving said optical system in a direction from the other end of said boundary region to said one end of said boundary region only in a case where said optical system passes through said other end of said boundary region by an overrun when a predetermined time has passed after said optical system passes through said one end of said boundary region, whereby said optical system stops inside of said boundary region.

3. A zooming optical system control device for controlling the setting of a zooming optical system to one of a plurality of regions such as a zooming region wherein said optical system ensures zooming photographing, a macro region wherein said optical system ensures macro photographing and a containment region wherein said optical system is contained into a predetermined position, said optical system comprising a zooming lens group, a macro lens group and a focusing lens group each disposed on one identical optical axis, said control device comprising;
(a) a generating means for generating a distinguishing information representing said one of a plurality of regions wherein said optical system is situated,
(b) an instructing means for instructing a setting region whereto said optical system is to be set,
(c) a driving means for driving said optical system in order to set said optical system to said setting region,
(d) a boundary detection means for receiving said distinguishing information and outputting a boundary signal when said optical system is situated at a boundary between two of said plurality of regions adjacent with each other, and
(e) a control means for controlling said driving means in such a manner that said driving means drives said optical system to said setting region when said control means receives an instruction from said instruction means, and that said driving means stops said optical system only when said control means receives both of said boundary signal and said instruction, whereby said optical system stops at said boundary based on said distinguishing information.

4. A zooming optical system control device for controlling the setting of a zooming optical system to one of a plurality of regions such as a zooming region wherein said optical system ensures zooming photographing, a macro region wherein said optical system ensures macro photographing and a containment region wherein said optical system is contained into a predetermined position, said optical system comprising a zooming lens group, a macro lens group and a focusing lens group each disposed on one identical optical axis, said control device comprising;
 (a) a generating means for generating a distinguishing information representing said one of a plurality of regions wherein said optical system is situated,
 (b) an instructing means for instructing a setting region whereto said optical system is to be set,
 (c) a driving means for driving said optical system in order to set said optical system to said setting region,
 (d) a boundary detection means for receiving said distinguishing information and outputting a boundary signal when said optical system is situated at a boundary between two of said plurality of regions adjacent with each other, and
 (e) a control means for controlling said driving means in such a manner that said driving means drives said optical system to said setting region when said control means receives an instruction from said instruction means, and that said driving means stops said optical system only when said control means receives both said boundary signal and said instruction in a case where said instruction represents that said driving means drives said optical system so as not to cross said boundary, and that said driving means does not stop said optical system at said boundary in a case where said instruction represents that said driving means drives said optical system so as to cross said boundary.

5. A zooming optical system control device for controlling the setting of a zooming optical system to one of a plurality of regions such as a zooming region wherein said optical system ensures zooming photographing, a macro region wherein said optical system ensures macro photographing and a containment region wherein said optical system is contained into a predeteremined position, said optical system comprising a zooming lens group, a macro lens group and a focusing lens group each disposed on one identical optical axis, said control device comprising;
 (a) an instructing means for instructing a setting region whereto said optical system is to be set,
 (b) a zoom driving means for driving said optical system in order to set said optical system to said setting region,
 (c) a focus driving means for driving said focusing lens group so as to adjust a focal length of said focusing lens group,
 (d) a stopping means disposed at both ends of a movable zone in which said focusing lens group can move for stopping a movement of said focusing lens group, said stopping means having at least one of said both ends an invariable stopping portion for making a stopping position of said optical system invariable irrespective of a change of said focal length and for allowing that said zooming lens group and said macro lens group move, and
 (e) a control means for controlling both of said zoom driving means and said focus driving means in such a manner that said focus driving means drives said focusing lens group to a vicinity of said invariable stopping portion before said zoom driving means drives said optical system to said setting region.

6. A zooming optical system control device for controlling the setting of a zooming optical system to one of a plurality of regions such as a zooming region wherein said optical system ensures zooming photographing, a macro region wherein said optical system ensures macro photographing and a containment region wherein said optical system is contained into a predetermined position, said optical system comprising a zooming lens group, a macro lens group and a focusing lens group each disposed on one identical optical axis, said control device comprising:
 (a) an instructing means for instructing a setting region whereto said optical system is to be set,
 (b) a zoom driving means for driving said optical system in order to set said optical system to said setting region,
 (c) a focus driving means for driving said focusing lens group so as to adjust a focal length of said focusing lens group,
 (d) a stopping means for stopping a movement of said focusing lens group and for inhibiting movements of said zooming lens group and said macro lens group, said stopping means having an inhibition area wherein a stopping position of said focusing lens group and inhibited positions of said zooming lens group and said macro lens group varys according to a change of said focal length, said stopping means having a noninhibition area wherein said movement of said focusing lens group and movements of said zooming lens group and said macro lens group is allowed, said inhibition area disposed to one of said both ends of a movable zone wherein said focusing lens group can move, said noninhibition area disposed within said movable zone is adjacent to said inhibition area,
 (e) a region judging means for judging whether said optical system is situated in said inhibition area or said non-inhibition area, and
 (f) a control means for controlling both of said zoom driving means and said focus driving means in such a manner that said focus driving means drives said focus lens group to said non-inhibition area when said optical system is within said inhibition area by way of said region judging means before said zoom driving means drives said optical system to said setting region.

* * * * *